(12) United States Patent
Epstein et al.

(10) Patent No.: US 11,642,196 B2
(45) Date of Patent: May 9, 2023

(54) ORTHODONIC TOOLS AND STORAGE CASE

(71) Applicant: ORTHONU LLC, Rumson, NJ (US)

(72) Inventors: Sima Yakoby Epstein, Rumson, NJ (US); Douglas F. Melville, Jr., Simsbury, CT (US)

(73) Assignee: Orthonu, LLC, Rumson, NJ (US)

( * ) Notice: Subject to any disclaimer, the term of this patent is extended or adjusted under 35 U.S.C. 154(b) by 0 days.

(21) Appl. No.: 17/357,864

(22) Filed: Jun. 24, 2021

(65) Prior Publication Data

US 2022/0175493 A1    Jun. 9, 2022

Related U.S. Application Data

(60) Provisional application No. 63/121,868, filed on Dec. 5, 2020.

(51) Int. Cl.
*A61C 7/02* (2006.01)
*A61C 7/04* (2006.01)

(52) U.S. Cl.
CPC ............... *A61C 7/023* (2013.01); *A61C 7/04* (2013.01); *A61C 2201/00* (2013.01)

(58) Field of Classification Search
CPC ....... A61C 7/023; A61C 7/04; A61C 2201/00; A45D 29/00; A45D 29/02; B21F 11/00
See application file for complete search history.

(56) References Cited

U.S. PATENT DOCUMENTS

| | | | |
|---|---|---|---|
| 1,103,606 A | 7/1914 | Montag | |
| 1,299,103 A | 4/1919 | Angle | |
| 3,261,094 A * | 7/1966 | Bliss | A45D 29/02 206/38.1 |
| 3,727,316 A | 4/1973 | Goldberg | |
| 4,669,979 A | 6/1987 | Snead | |
| 5,084,935 A | 2/1992 | Kalthoff | |
| 5,395,236 A | 3/1995 | Khouri | |
| 5,419,047 A | 5/1995 | Farzin-Nia | |
| D852,420 S | 6/2019 | Deng | |
| 2004/0064897 A1 * | 4/2004 | Muller | A45D 29/02 7/162 |

OTHER PUBLICATIONS

Nail Clippers for Thick Nails—Dr. Mode 15mm Wide Jaw Opening Extra Large Toenail Clippers Cutter with Nail File for Thick Nails, Heavy Duty Fingernail Clippers for Men, Seniors, www.amazon.com, first available Aug. 21, 2018, 1 page (Veaor 90178) (Year: 2018) (Year: 2018).*

(Continued)

*Primary Examiner* — Cris L. Rodriguez
*Assistant Examiner* — Drews S Folgmann
(74) *Attorney, Agent, or Firm* — Cooper & Maersch LLC; Lorri W. Cooper

(57) ABSTRACT

An orthodontic tool includes a trimmer having a lever, a base, and a spring positioned between the lever and the base. A first substantially transversely extending portion extends from the lever and a second substantially transversely extending portion extends from the base. A cutting surface is associated with each transversely extending portion. The orthodontic tool also includes a tool set having at least two arms coupled together at one end by a fastener and the arms including two or more of a sanding tool, a hook, and a pick.

9 Claims, 21 Drawing Sheets

(56) References Cited

OTHER PUBLICATIONS

Shyamala, et al., "Management of Orthodontic Emergencies—To Act or Not?", In International Journal of Oral Health Dentistry, vol. 4, No. 3, Jul.-Sep. 2018, pp. 205-207.
Malekshoar, et al., "Challenges, Limitations, and Solutions for Orthodontists During the Coronavirus Pandemic: A Review", In American Journal of Orthodontics and Dentofacial Orthopedics, vol. 159, No. 1, Jan. 2021, pp. e59-e71.
American Association of Orthodontists, "Handling Orthodontic Emergencies", aaoinfo.org, 1 page.

* cited by examiner

ORTHODONIC TOOLS AND STORAGE CASE

FIELD

The invention concerns an orthodontic tool and a storage case. In particular, the invention concerns an orthodontic tool for use with traditional wire braces as well as with clear aligners. In another embodiment, the invention concerns an orthodontic tool set and a storage case.

BACKGROUND

There are at least two types of braces used by consumers to straighten teeth, including traditional wire braces and clear aligners. Traditional wire braces use brackets that are adhered to the teeth and a wire extends between brackets, such as an arch wire, to encourage teeth to move. They are periodically tightened to straighten the teeth. Traditional braces are typically visible to others, although one type of traditional braces can be positioned on a rear surface of the teeth. Clear aligners are typically clear plastic or acrylic trays that are tight-fitting custom-made mouthpieces that slip over the teeth. A series of trays is used in succession to straighten teeth slowly. Clear aligners are typically not visible to others, or only slightly visible.

Various types of appliances can be used with traditional braces. Some can also be used with clear aligners. One types of appliance is elastics (rubber bands), which are used to improve the fit of upper and lower teeth. Separators or spacers are little rubber doughnuts that may be placed between teeth to push them apart so that orthodontic bands can be placed onto teeth. Separators are used when braces are installed. Retainers are devices that can be removable or fixed. They hold teeth in their new, correct positions after teeth have been straightened. A Rapid Palatal Expander (RPE) is another common appliance used for patients who have a posterior crossbite. It is cemented to the upper teeth and a screw in the center of the appliance is turned by the patient to widen the appliance. As the appliance widens, the crossbite is corrected.

Other types of appliances include a pendulum, a Herbst Appliance, a Twin Block Appliance, a facemask headgear, a DMAX, an MSX, a bite opening retainer, a Bite Turbo, a Schwarz/Sagittal appliance, and CS-2000s. Each of these appliances is known by those of skill in the art and serves a specific purpose.

During treatment with traditional braces, a user may experience a broken wire or a sharp end to a wire. This causes the inside of the mouth to be poked and cut and often results in an additional, earlier visit to the orthodontist to correct the problem. Many patients also wear orthodontic rubber bands with traditional braces and aligners. Orthodontic rubber bands are very small, and it is often difficult for users to install rubber bands, especially when dealing with small mouths. At times, clear aligners can include rough or scratchy patches that serve to irritate a user's mouth. A visit to an orthodontist is typically needed to fix the issue. It is desirable to provide a tool that can be used safely by a patient without requiring a visit to the orthodontist.

SUMMARY

An orthodontic tool is shown and described that incorporates features making it easier to fix issues that may arise with traditional braces and clear aligners. Close fitting boxes are also shown and described for storing the tools.

DETAILED DESCRIPTION

Figure 1:
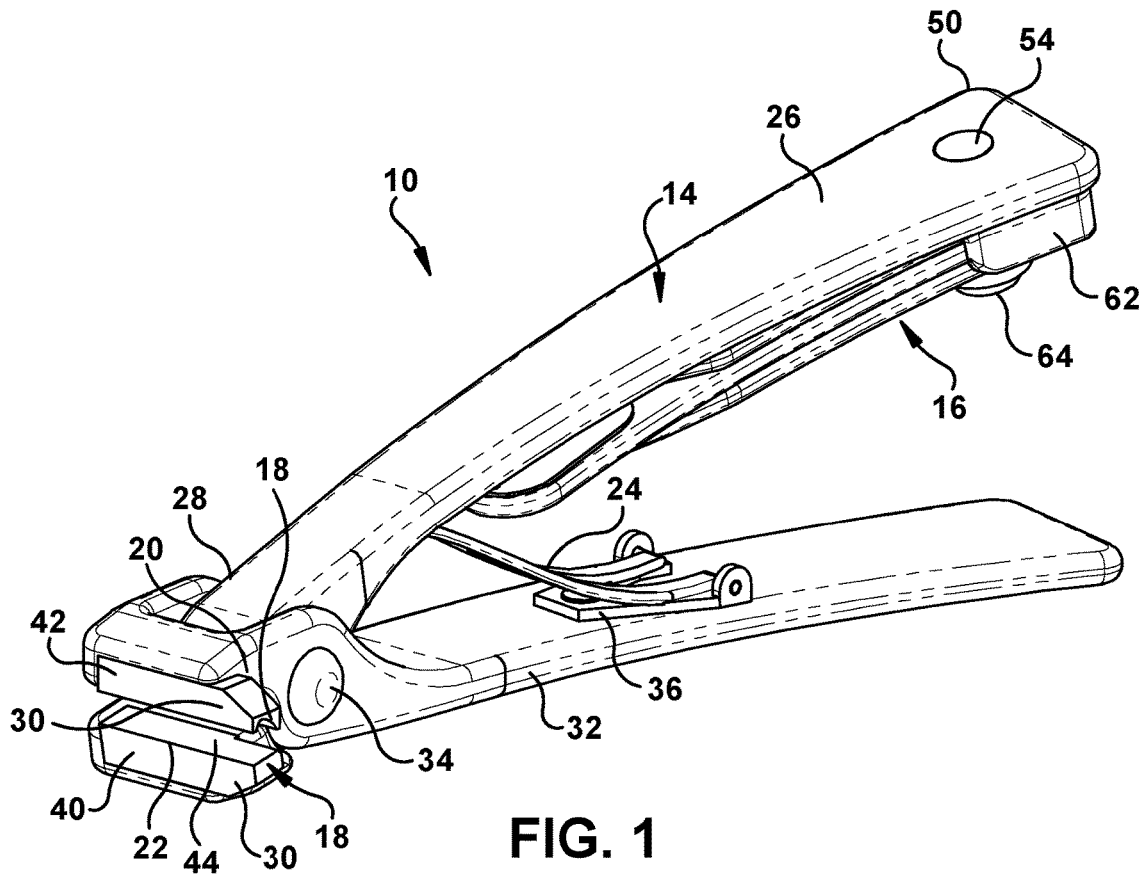
FIG. 1 depicts a perspective view of an orthodontic tool in the form of a trimmer and a tool set positioned at the rear of the tool, with the spring of the trimmer shown stowed in a forward position.

The present invention is directed toward an orthodontic tool 10 that can be used to limit unscheduled visits to the orthodontist to fix issues with a user's braces or aligners. The present invention is also directed towards a storage and/or cleaning container 12 that can be used to store and/or clean the orthodontic tool 10. The container 12 can be shaped to accommodate any number of differently sized orthodontic devices, such as an orthodontic trimmer 14, an orthodontic tool set 16, aligners, retainers, toothbrushes, and the like.

The invention concerns an orthodontic tool 10 that includes one or both of an orthodontic trimmer 14 that is used for trimming wires inside the mouth of a person wearing braces, or an orthodontic tool set 16 that includes a set of tools 16 that can be used to aid a person wearing braces or aligners. The orthodontic tool set 16 can be affixed to the trimmer 14. Alternatively, the orthodontic tool set 16 can be separate from the trimmer 14 and either used with the trimmer 14 or used without the trimmer 14. In each case, a storage container 12 can be provided for storing either the trimmer 14, the tool set 16, or both. The tool set 16 may be integral with the trimmer 14, but removable therefrom, if desired.

In use, the trimmer 14 is inserted into a user's mouth and is used for trimming any wires that can irritate a user's mouth. The trimmer 14 is similar to a nail trimmer, except for the blades or cutting edges 18 are positioned on the side 20 instead of along the leading edge 22 of the trimmer 14. The trimmer 14 is configured such that it has a low profile permitting it to be positioned inside a user's mouth.

The trimmer 14 is shown as having a curved, arced shape so that it mimics a shape of parts of the mouth. Alternatively, in one embodiment, the trimmer 14 may be straight. In both cases, the trimmer 14 is similar to a nail clipper in that it includes a spring 24 that holds up a handle or lever 26, and a cutter 18 at a leading end 28 of the trimmer 14, albeit with the cutter 18 positioned on the side 20 of the trimmer 14. The trimmer 14 has a length and a longitudinal axis X-X defined along the length of the trimmer 14. The cutter 18 extends outwardly to the side 20 of the trimmer 14 so that the trimmer 14 can be inserted parallel to the dental arch of the teeth inside a user's mouth. The cutter 18 cuts in a substantially perpendicular direction to the longitudinal axis X-X of the trimmer 14. The cutting occurs transverse to the longitudinal axis X-X.

To perform cutting of a wire in a user's mouth, the lever 26 is pressed downwardly (or upwardly if the trimmer 14 is positioned upside down) and a wire is clipped at the side edge 20 of the trimmer 14. This is different from a traditional nail clipper where clipping occurs at blades that are positioned at the leading end 28 of the clipper. The lever 26 is spring loaded so that as a user presses the handle 26 downwardly, it forces the cutter 18 and its associated cutting blade or blades 18 to close and to clip or trim a wire that is positioned to the side 20 of the trimmer 14.

A typical nail clipper includes a lever, a pin, a base, and blades positioned at a leading edge of the base. The pin couples the lever to the base. The base includes two pieces of metal that are positioned on top of each other and are separated at the blade end by part of the pin. The blades are generally positioned in front of the pin. The pin is a small cylindrical piece of metal that is used to hold the device together adjacent the blades. The other end of the base can be coupled together in any known manner, such as by welding, riveting, brazing, soldering, or other known connecting technique. Conventional nail trimmers also permit the lever to be folded down and inactivated by rotating the lever about the pin. In additional, conventional nail trimmers may include a file positioned at a rear end of the trimmer.

A conventional nail clipper has cutting blades positioned on a leading edge of the clipper at the leading end of the clipper. The present trimmer 14 is designed to cut a wire with a blade or blades 18 that are positioned on the side 20 of the trimmer 14, for example, substantially perpendicular to the leading edge 22 of the trimmer 14. The blades 18 may be positioned adjacent the leading end 28 of the trimmer 14 or may be spaced from the leading end 28 of the trimmer 14. The blades 18 may be positioned on a protrusion 30 that extends outwardly from the side edge 20 of the lever 26 and the base 32 of the trimmer 14.

With a conventional nail trimmer, the lever may be stowed and inactive, or rotated into an active position. In the active position, the lever is pressed to operate the cutting blades at the leading edge of the clipper. In the active position, the lever extends upwardly at approximately a 40-60 degree angle relative to the base. This angle is too steep for use in a user's mouth because it would cause the lever to stick out too much and could impact a user's cheek or another part of the mouth, or at minimum make it difficult to operate. The present trimmer 14 has a lever 26 with an angle that is less than approximately a 40-degree angle relative to the base 32. Other angles may be approximately: 35 degrees, 30 degrees, 25 degrees, 20 degrees, 15 degrees, or 10 degrees. Any of these angles would place the trimmer 14 in a workable position in a user's mouth and permit a user to operate the trimmer 14 to cut a wire.

FIGS. 1-10 depict a design for a trimmer 14 according to the invention. The trimmer 14 has a length defining a longitudinal axis X-X thereof. The trimmer 14 has a curved shape to mimic the shape of a user's mouth and the user's dental arch more closely. Since the trimmer 14 is inserted between the cheek and the teeth, the arced shape makes it easier to insert the trimmer 14 into the user's mouth in view of the curved shape of the dental arch. The trimmer 14 includes an upper lever 26 and a lower base 32. The lever 26 and the base 32 are coupled by a pin 34 that is oriented horizontally and is transverse relative to the longitudinal axis X-X of the trimmer 14. The pin 34 is positioned adjacent the leading end 28 of the trimmer 14 to couple the lever 26 and base 32 together. The lever 26 of the trimmer 14 swaps positions with the base 32 of the trimmer 14 in front of the pin 34 at the leading end 28 of the trimmer 14, so that the lever 26 forms the bottom of the trimmer 14 and the base 32 forms the top of the trimmer 14 in front of the pin 34. A pair of mating protrusions 30 having cutting surfaces 18 and/or blades 18 extend outwardly to the side 20 of the trimmer 14 adjacent or at the leading end 28 of the trimmer 14. The protrusions 30 include the cutting surfaces 18 for cutting a wire. The cutting surfaces 18 are on a side edge 20 of the trimmer 14, not on the leading edge 22 of the trimmer 14. The cutting surfaces 18 and/or blades 18 are positioned substantially perpendicular to the longitudinal axis X-X of the tool. The protrusions 30 may be perpendicular to the longitudinal axis X-X of the tool or may be angled at a non-perpendicular angle. The term substantially perpendicular is used herein to describe how the protrusions 30 extend out from the side 20 of the device and that the cutting surfaces 18 do not align with the longitudinal axis X-X.

A spring 24 is positioned between the lever 26 and the base 32 at a substantially central location. The spring 24 can be rotated between a forward position and a rearward position. In the forward position, which is the position closest to the leading end 28 of the trimmer 14, the spring 24 is inactive and considered stowed. In the rearward position, the spring 24 is in an active position where it is operable. The spring 24 may be a leaf spring. The spring 24 may be any type of spring, as known by those of skill in the art.

The spring 24 is shown coupled to a support mechanism 36 that has two spaced apart pin-receiving members coupled to a flat base. The support mechanism 36 can be coupled to the base 32 via a pin 38 or other mechanism. The pin 38 may extend through the base 32. The support mechanism 36 is coupled to the base 32 via the pin 38 or any other type of fastener that can be used to couple the support mechanism 36 to the base 32. The support mechanism 36 includes two arms that include outwardly extending pins for insertion into the pin-receiving members. The spring 24 is coupled to the support mechanism 36 via the pins and rotates around the pins between a forward position and a backward position, as shown in the figures. While the spring 24 pivots about a central location, it could be positioned at other locations on the base 32. Furthermore, another type of pivoting mechanism could be used, or the spring 24 could be fixed in position so that it is not movable between a stowed and an active position.

Figure 2:
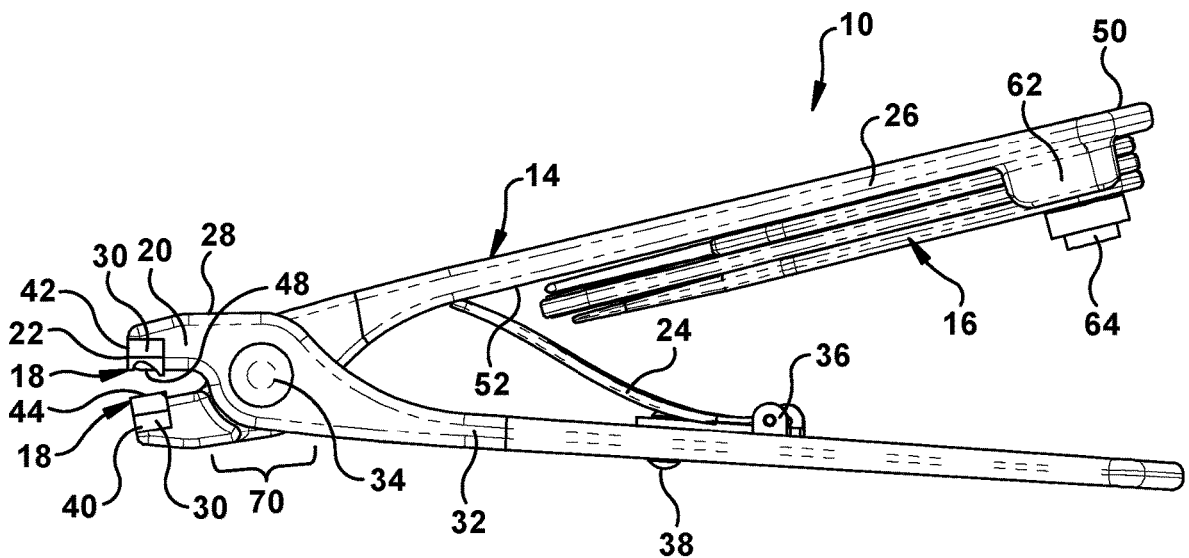
FIG. 2 depicts a left side view of the orthodontic tool of FIG. 1.
Figure 3:
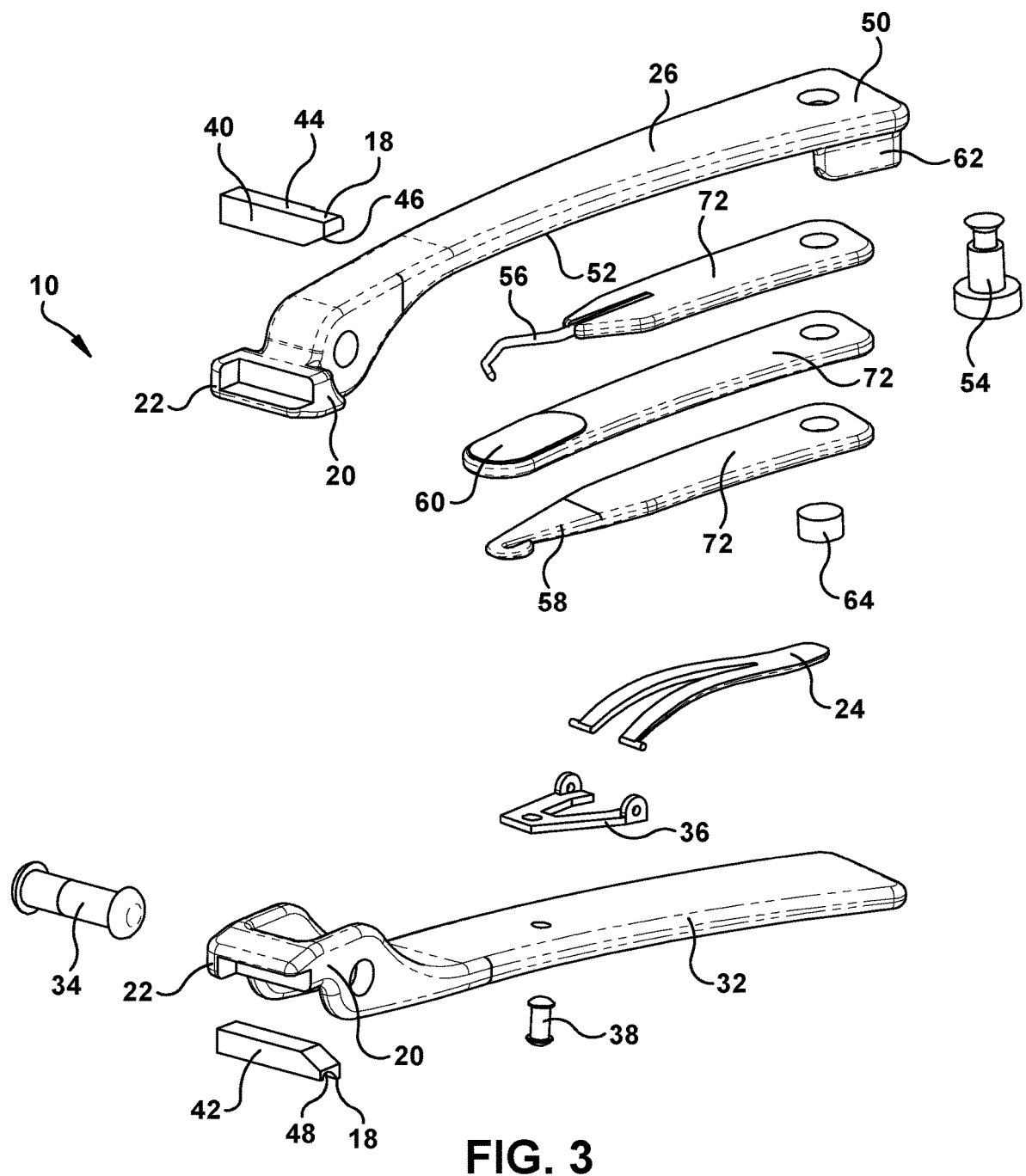
FIG. 3 depicts an exploded view of the orthodontic tool of FIG. 1.
Figure 4:
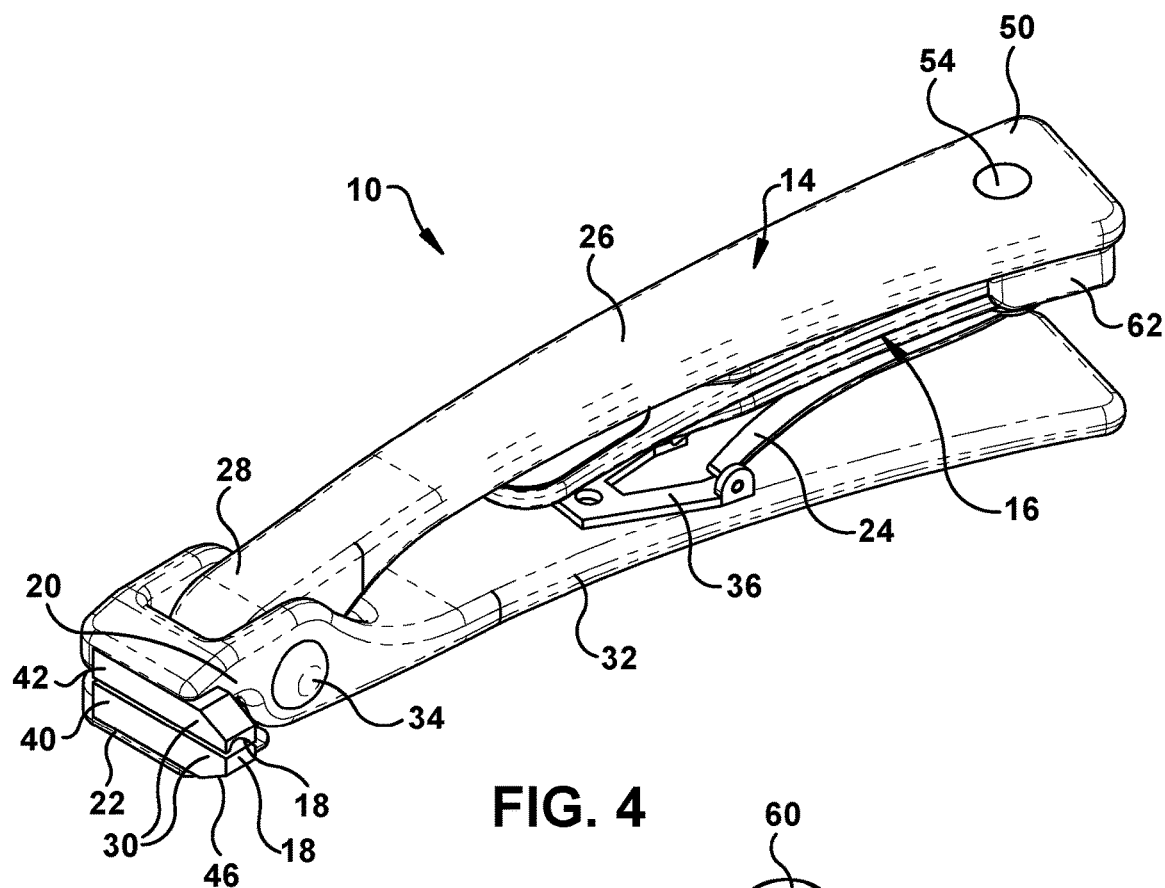
FIG. 4 depicts a perspective view of the orthodontic tool of FIG. 1 with the trimmer having the spring in a rearward, engaged position.
Figure 5:
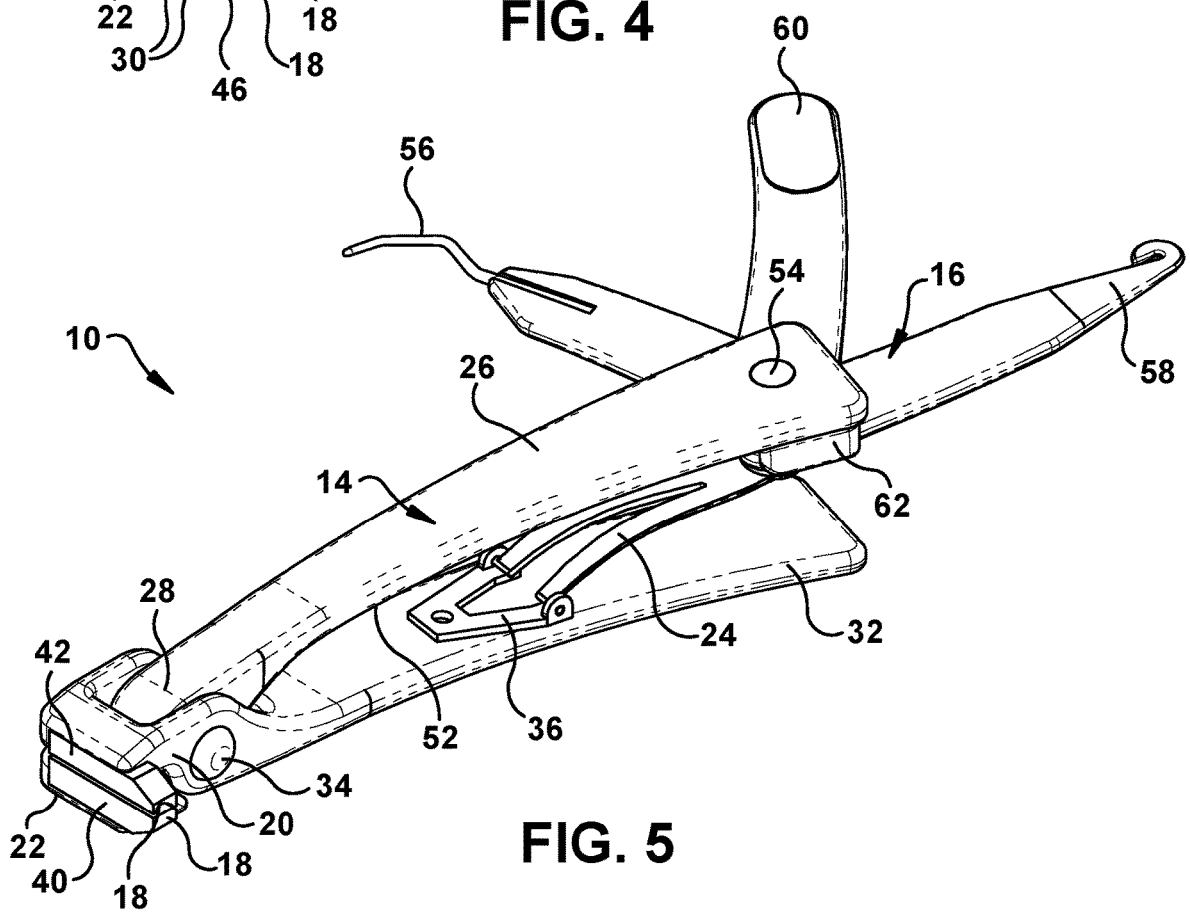
FIG. 5 depicts a perspective view of the orthodontic tool of FIG. 4 with the tool set shown extending from the rear end of the trimmer.
Figure 6:
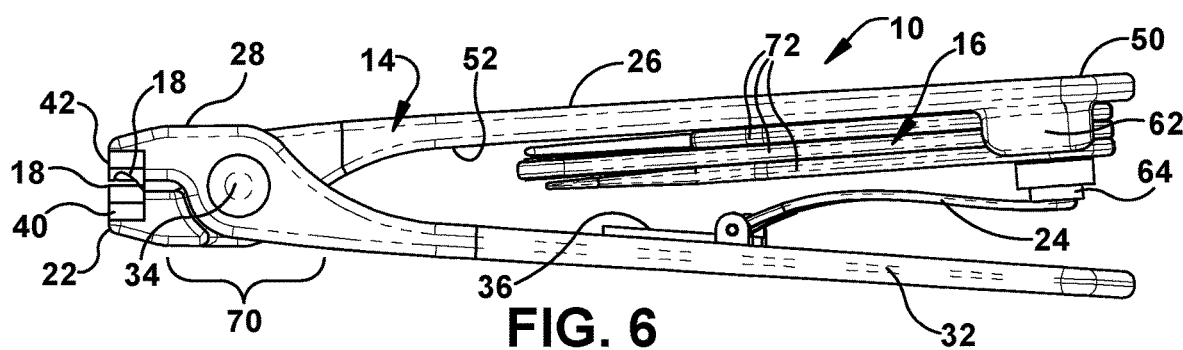
FIG. 6 depicts a left-side view of the orthodontic tool of FIG. 4.

As shown best in FIGS. 2 and 3, teeth members 40, 42 form the cutting mechanism at the leading end 28 of the trimmer 14. The teeth members 40, 42 are shown as being inserts into the leading end 28 of the trimmer 14 but could be integral parts of the trimmer 14. The teeth members 40, 42 extend outwardly past the side edge of the trimmer 14 to form the protrusions 30 that perform cutting in the user's mouth. The teeth members 40, 42 could be coupled to the trimmer 14 at a position spaced from the leading end 28 of the trimmer 14, if desired. The teeth members 40, 42 may be attached to the base 32 and the lever 26 in any known manner, such as welding, gluing, etc. The lower tooth member 40 has a substantially flat upper surface 44 and an upwardly angled bottom surface 46 where the lower tooth member 40 protrudes from the side 20 of the trimmer 14. The upper tooth member 42 has a curved, downwardly facing cutting surface 18 that mates with the upper surface 44 of the lower tooth member 40 to cut a wire. The cutting edge 18 of the upper tooth member 42 extends outwardly to the side of the orthodontic tool 10 and is not positioned at the leading edge 22 of the trimmer 14. The cutting edge 18 is shown being positioned on the upper tooth member 42. Alternatively, the cutting edge 18 could be positioned on the lower tooth member 40. The cutting edge 18 could be positioned on both the upper and lower tooth members 40, 42, if desired.

In some embodiments, as shown in FIGS. 1-10, an orthodontic tool set 16 is positioned at the rear end 50 of the tool between the lever 26 and the base 32. In the embodiment shown, the tool set 16 is somewhat hidden between the lever 26 and the base 32. The tool set 16 is pivotally attached to the lower side 52 of the lever 26 via a pin 54 that permits the tools to rotate out from under the lever 26 in a substantially parallel manner to the orientation of the lever 26. The tool set 16 includes multiple tools, which may be rotated out individually or in combination with one another. The tool set 16 includes a toothpick attachment or pick 56, a sickle shaped attachment or hook 58, and a sanding attachment 60.

The toothpick attachment 56 of the tool set 16 is used for a) removal of food/debris between teeth for patients who are wearing braces or aligners, b) unlock self-ligating brackets when lose off a wire, and c) removal of a rubber band off a bracket. The sickle-type attachment 58 is used for removal of aligners from the teeth/mouth and for assistance with attaching rubber bands to and from braces or aligners. The sanding attachment 60 is a file or sanding pad that is used for smoothing out any type of acrylic attachment used with aligners. The sanding attachment 60 can also be used for smoothing wire ends inside the mouth. The tools of the tool set 16 are positioned adjacent one another and stow under the lever 26 and above the base 32. When the tools are stowed, they typically do not extend outside of the footprint of the trimmer 14, although they could, if desired.

A stop 62 is positioned at the rear end 50 of the trimmer 14 and serves as a point where rotation of the tool set 16 is halted under the lever 26. The tools of the tool set 16 may rotate away from the stop 62, but, when being stowed, they are rotated until they abut the stop 62. The tools of the tool set 16 have similar lengths, although they may or may not be identical. Alternatively, the tools of the tool set 16 could be different lengths.

A magnet 64 is attached to the bottom end of the pin 54 that is used to couple the tool set 16 to the lever 26. The magnet 64 is used to couple to the spring 24 when it is rotated into the active position.

Although not shown, the tool set 16 could be coupled to the base 32. The tool set 16 could be coupled to an upper surface of the lever 26, the lower surface of the lever 26, an upper surface of the base 32, or a lower surface of the base 32, if desired.

Figure 7:
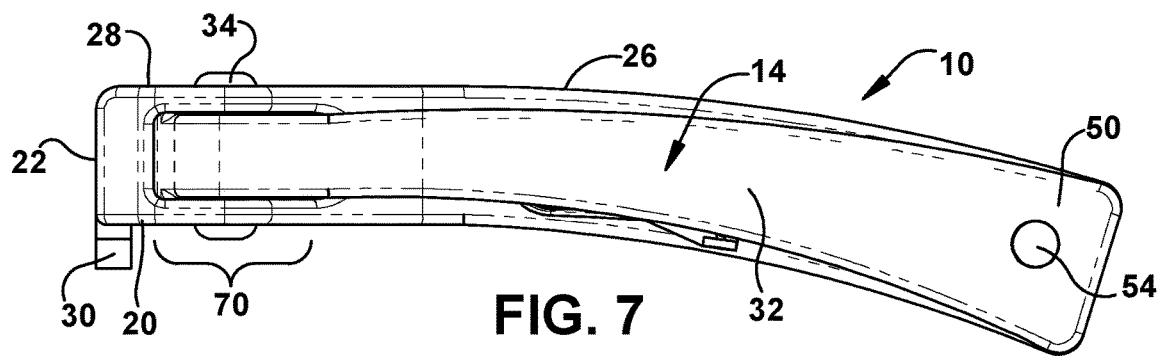
FIG. 7 depicts a top view of the orthodontic tool of FIG. 4.
Figure 8:
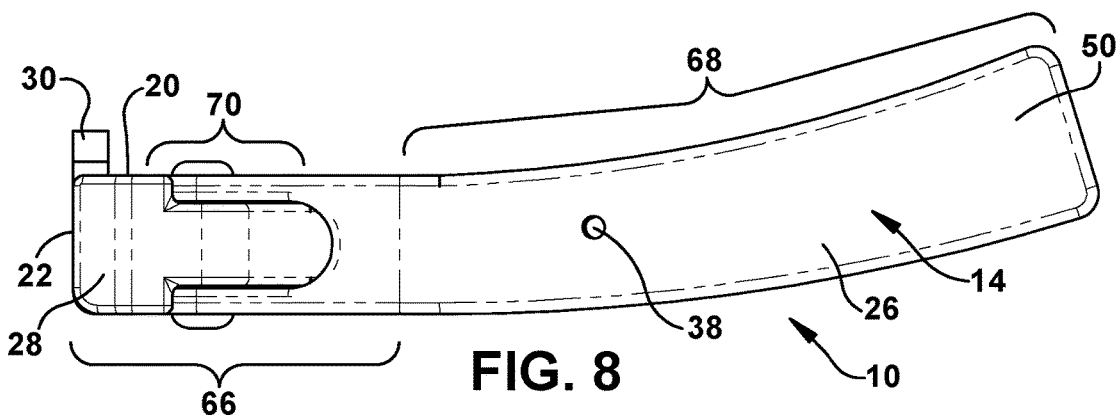
FIG. 8 depicts a bottom view of the orthodontic tool of FIG. 4.
Figure 9:
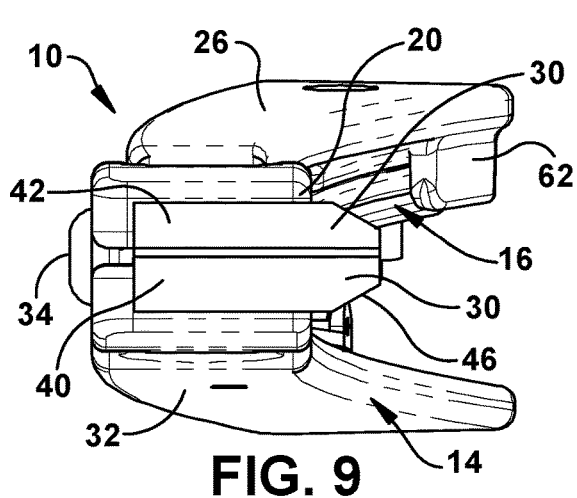
FIG. 9 depicts a front view of the orthodontic tool of FIG. 4.
Figure 10:
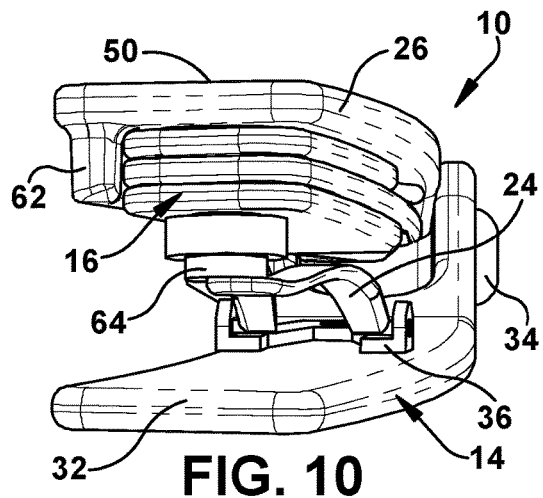
FIG. 10 depicts a rear view of the orthodontic tool of FIG. 4.
Figure 11:
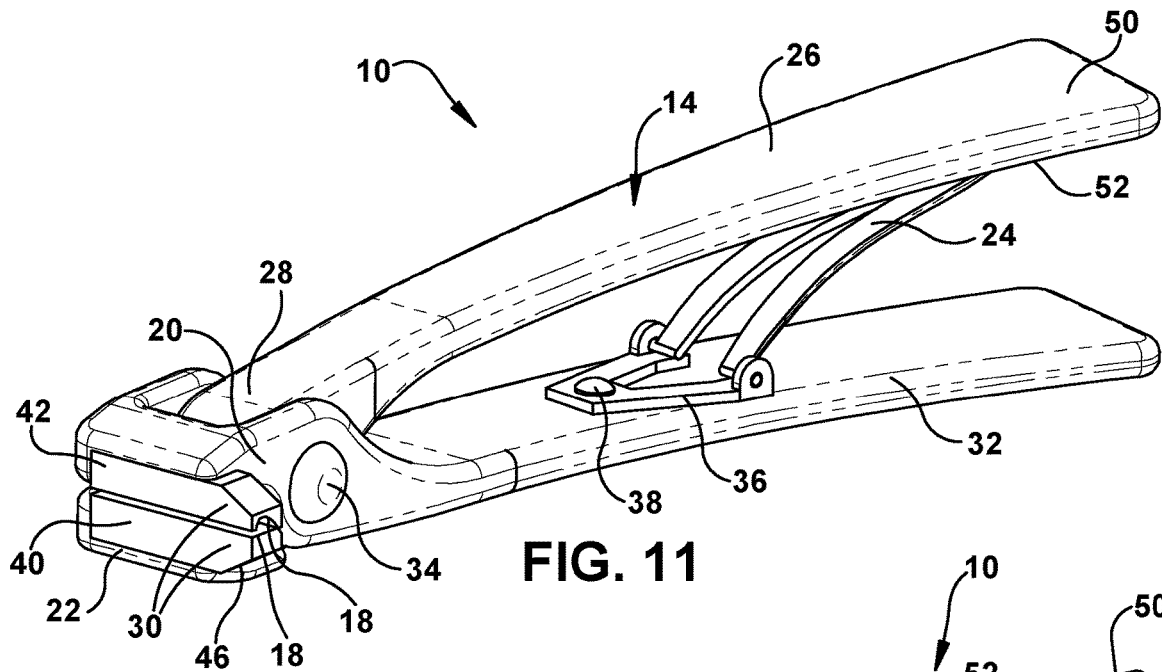
FIG. 11 depicts a perspective view of an alternative embodiment of the orthodontic tool according to the invention, with the orthodontic tool being a wire trimmer.
Figure 12:
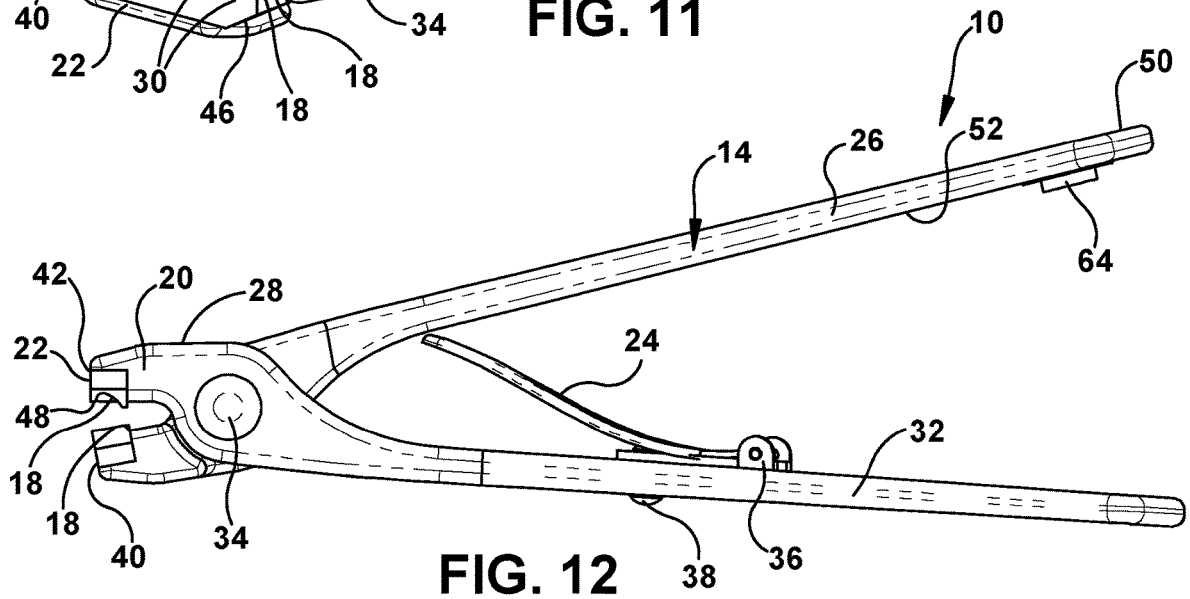
FIG. 12 depicts a left side view of the orthodontic tool of FIG. 11 with the biasing spring shown in a stowed position.
Figure 13:
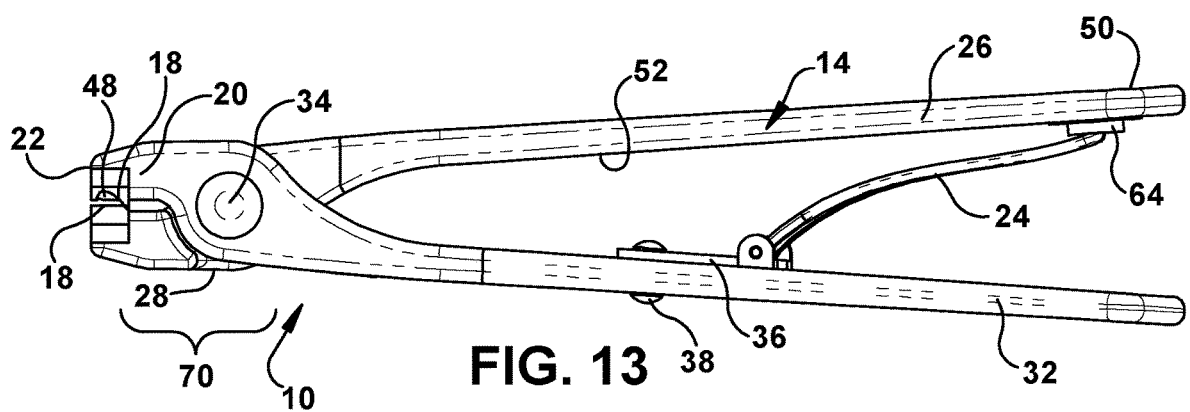
FIG. 13 depicts a left side view of the orthodontic tool of FIG. 11 with the biasing spring shown in an engaged position.
Figure 14:
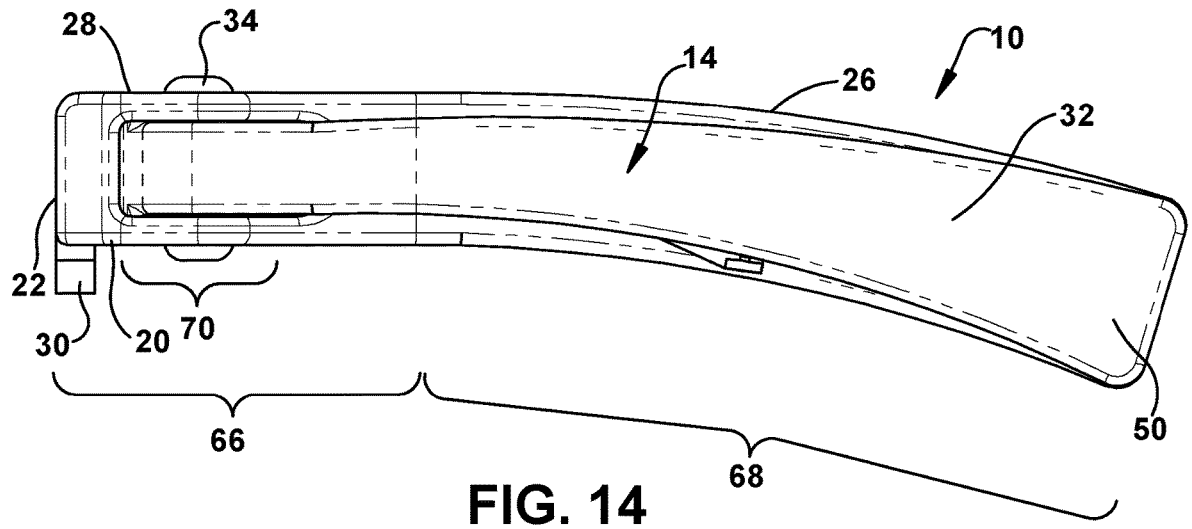
FIG. 14 depicts a top view of the orthodontic tool of FIG. 11.
Figure 15:
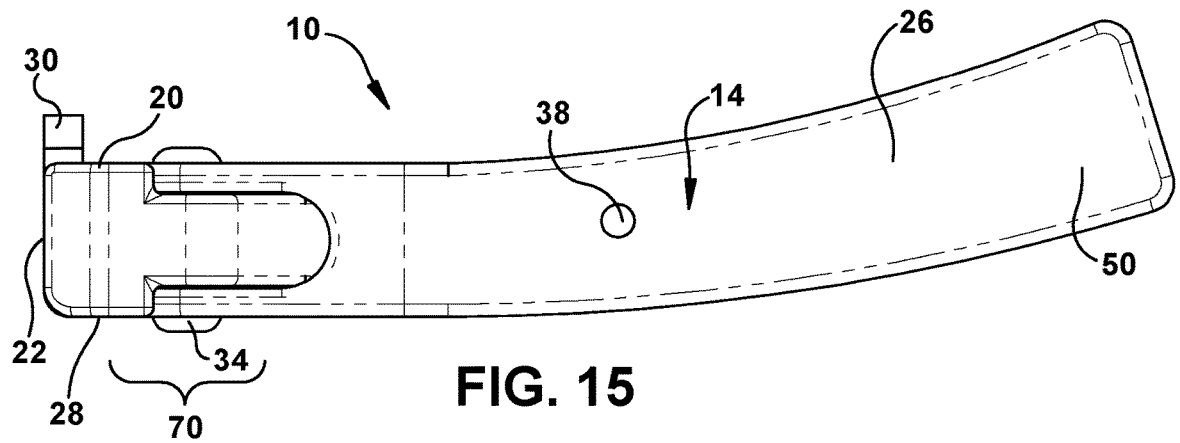
FIG. 15 depicts a bottom view of the orthodontic tool of FIG. 11.
Figure 16:
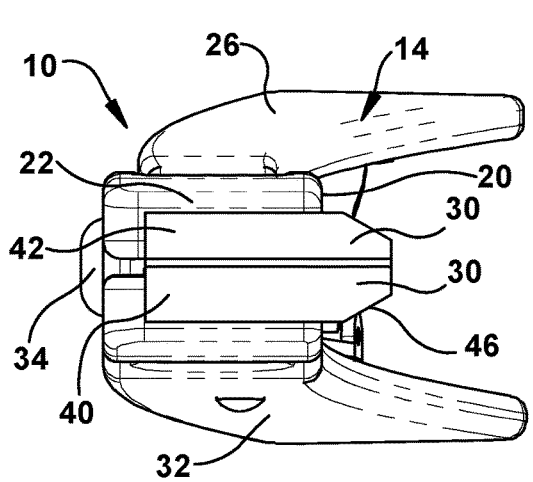
FIG. 16 depicts a front view of the orthodontic tool of FIG. 11.
Figure 17:
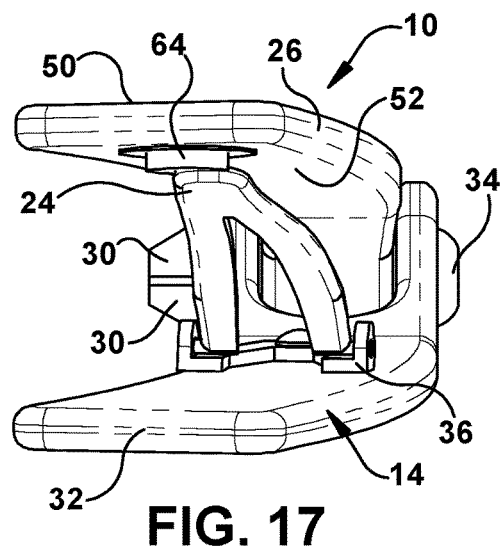
FIG. 17 depicts a rear view of the orthodontic tool of FIG. 11.
Figure 18:
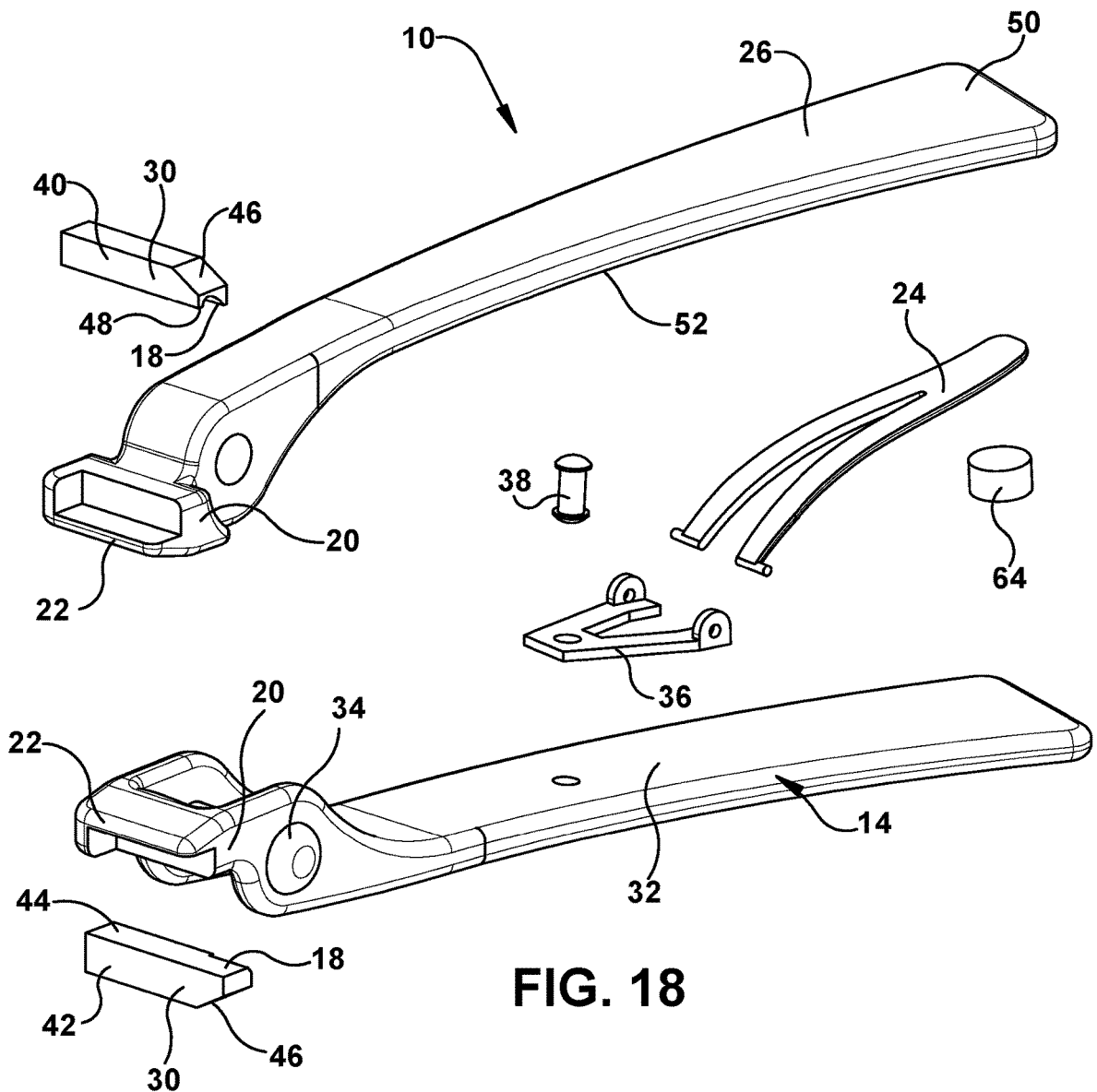
FIG. 18 depicts an exploded perspective view of the orthodontic tool of FIG. 11.
Figure 19:
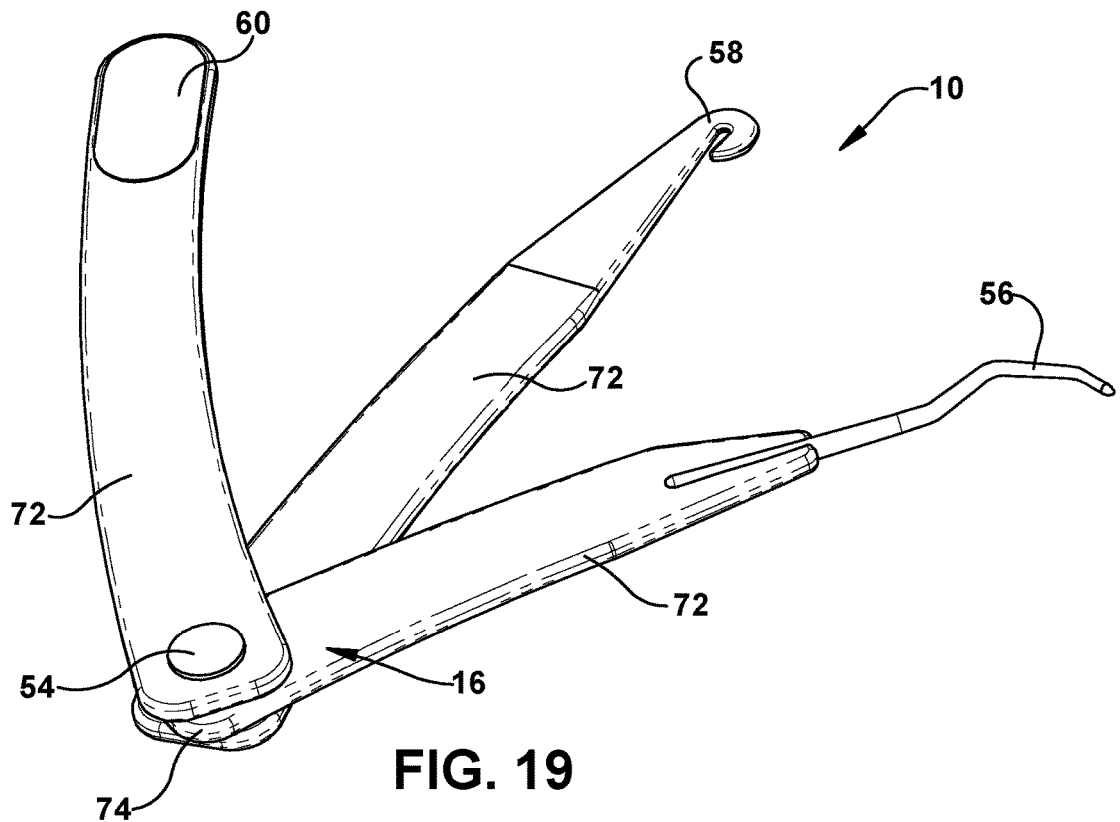
FIG. 19 depicts a perspective view of an alternative embodiment of a tool set according to the invention.
Figure 20:
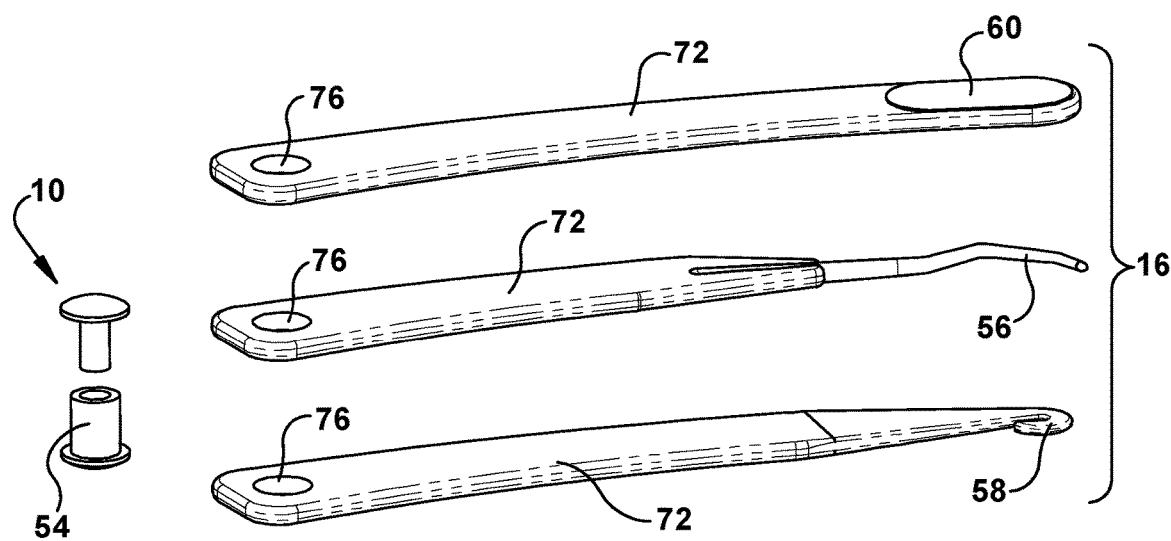
FIG. 20 depicts an exploded perspective view of the tool set shown in FIG. 19.
Figure 21:
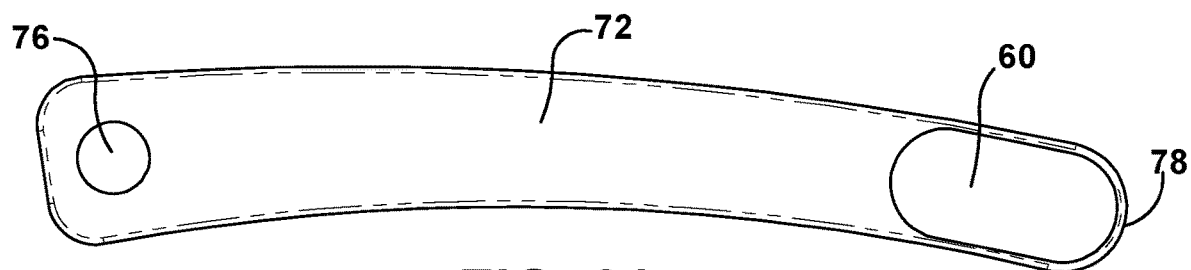
FIG. 21 depicts a top view of part of the tool set shown in FIG. 19.
Figure 22:
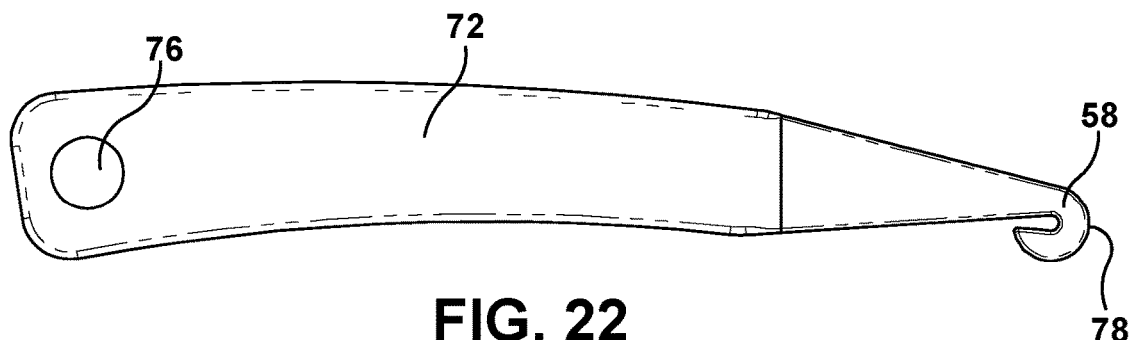
FIG. 22 depicts a top view of another part of the tool set shown in FIG. 19.
Figure 23:
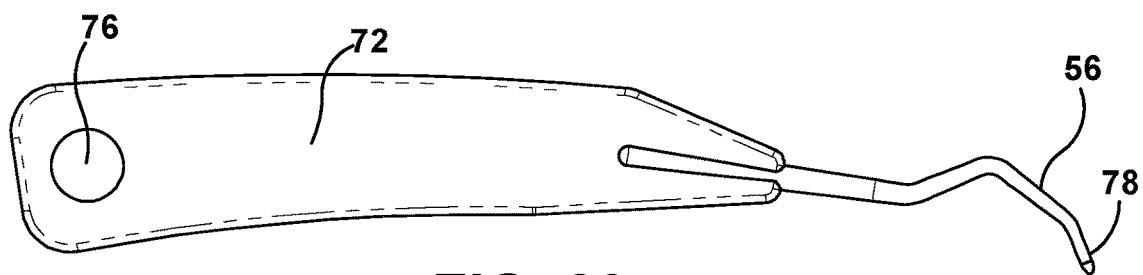
FIG. 23 depicts a top view of yet another part of the tool set shown in FIG. 19.
Figure 24:
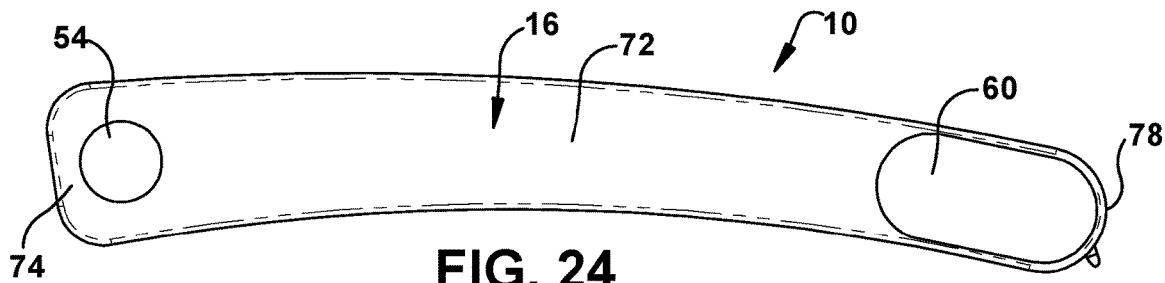
FIG. 24 depicts a top view of the assembled tool set shown in FIG. 19 in a closed position.

As shown best in FIGS. 7 and 8, the forward end/leading end 28 of the trimmer 14 has a substantially rectangular shape 66 for approximately the first ⅓ length of the trimmer 14. The remaining ⅔ length of the trimmer 14 at the rear end 50 has a curved, or arc-shape 68. Alternatively, the rectangular portion 66 could be longer or shorter and the curved portion 68 at the rear end 50 could be longer or shorter than shown. The width of the curved section 68 at the rear end 50 has a width that increases from the end of the rectangular portion to the rear end 50 of the trimmer 14. Alternatively, the width of the curved portion 68 could be of constant width.

The lever 26 is positioned above the base 32 at the rear end 50 of the trimmer 14. The lever 26 and the base 32 switch positions at the leading end 28 of the trimmer 14. A transition region 70 transitions the lever 26 from the top to the bottom and the base 32 from the bottom to the top of the trimmer 14.

FIGS. 11-18 depict a trimmer 14 that does not have a tool set 16 attached. The trimmer 14 includes a magnet 64 like that shown in FIGS. 1-10. The magnet 64 can be connected to the lever 26 by any known manner, including utilizing a pin like used in FIGS. 1-10, with the pin being shorter since the tool set 16 is not utilized. The magnet may be attached in any known manner, including welding, adhering, or other means. Otherwise, the trimmer 14 shown in FIGS. 11-18 is substantially the same as that shown in FIGS. 1-10.

FIGS. 19-28 depict the tool set 16 shown in FIGS. 1-10, but with the tool set 16 being removed from the trimmer 14. The tool set 16 includes a plurality of substantially flat, bar-shaped arms 72 that are coupled together at their rear ends 74 by a pin 54 that extends through a hole 76 that is positioned through each arm 72 at the rear end 74 thereof. Each of the arms 72 has a similar shape at the rear end 74 and transitions into a tool at the leading end 78. One arm 72 has a sanding pad or file 60 coupled to an upper surface of the arm 72 by any known means. Another arm includes a pick or toothpick 56 that is wire-shaped and is inserted into/coupled to the arm 72 by any known means. Another arm 72 includes a hook 58 positioned at the leading end 78. The arms 72 are rotatable relative to one another in a parallel manner around the pin 54 such that the leading ends 78 of the arms 72 are separable and independently usable, even though coupled at the rear end 74.

Figure 25:
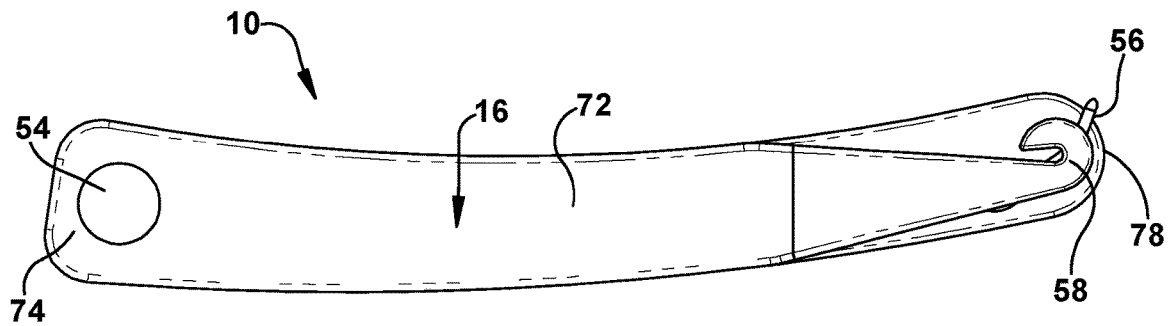
FIG. 25 depicts a bottom view of the assembled tool set shown in FIG. 19 in a closed position.
Figure 26:
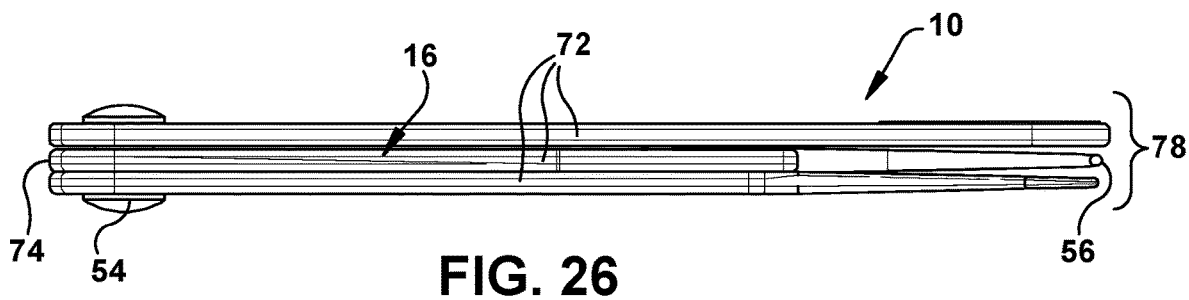
FIG. 26 depicts a right-side view of the tool set shown in FIG. 19 in a closed position.
Figure 27:
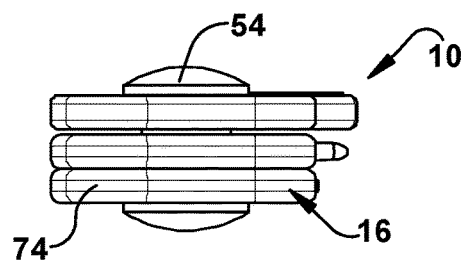
FIG. 27 depicts a rear view of the tool set shown in FIG. 19 in a closed position.
Figure 28:
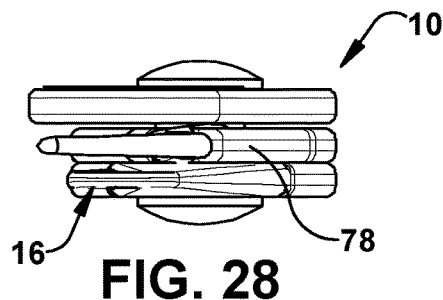
FIG. 28 depicts a front view of the tool set shown in FIG. 19 in a closed position.

Each arm 72 has a curved shape when viewed in a plan view. The profiles of each of the arms 72 is substantially the same at the rear end 74, although they could be different profiles. As shown in FIG. 25, the leading ends 78 of each of the tools are substantially aligned when the tool set 16 is closed.

The tool set 16 can be used with the trimmer 14 or separately from the trimmer 14. As shown in earlier embodiments, the tool set 16 can be an integral part of the trimmer 14. Alternatively, although not shown, the tool set 16 could be detachable from the trimmer 14 and usable separately from the trimmer 14 but can be reattached to the trimmer 14.

In an alternative embodiment, the tool set 16 could be straight and not curved. In each case, the tool set 16 includes three tools, including a sanding tool 60, a toothpick tool 56, and a sickle-shaped tool 58. While only three types of tools are shown, a different number of tools could be used, if desired. If desired, the tools could be combined on single members, such as the sanding pad 60 being positioned on the sickle 58 and the sickle 58 being combined with the pick 56.

Figure 29:
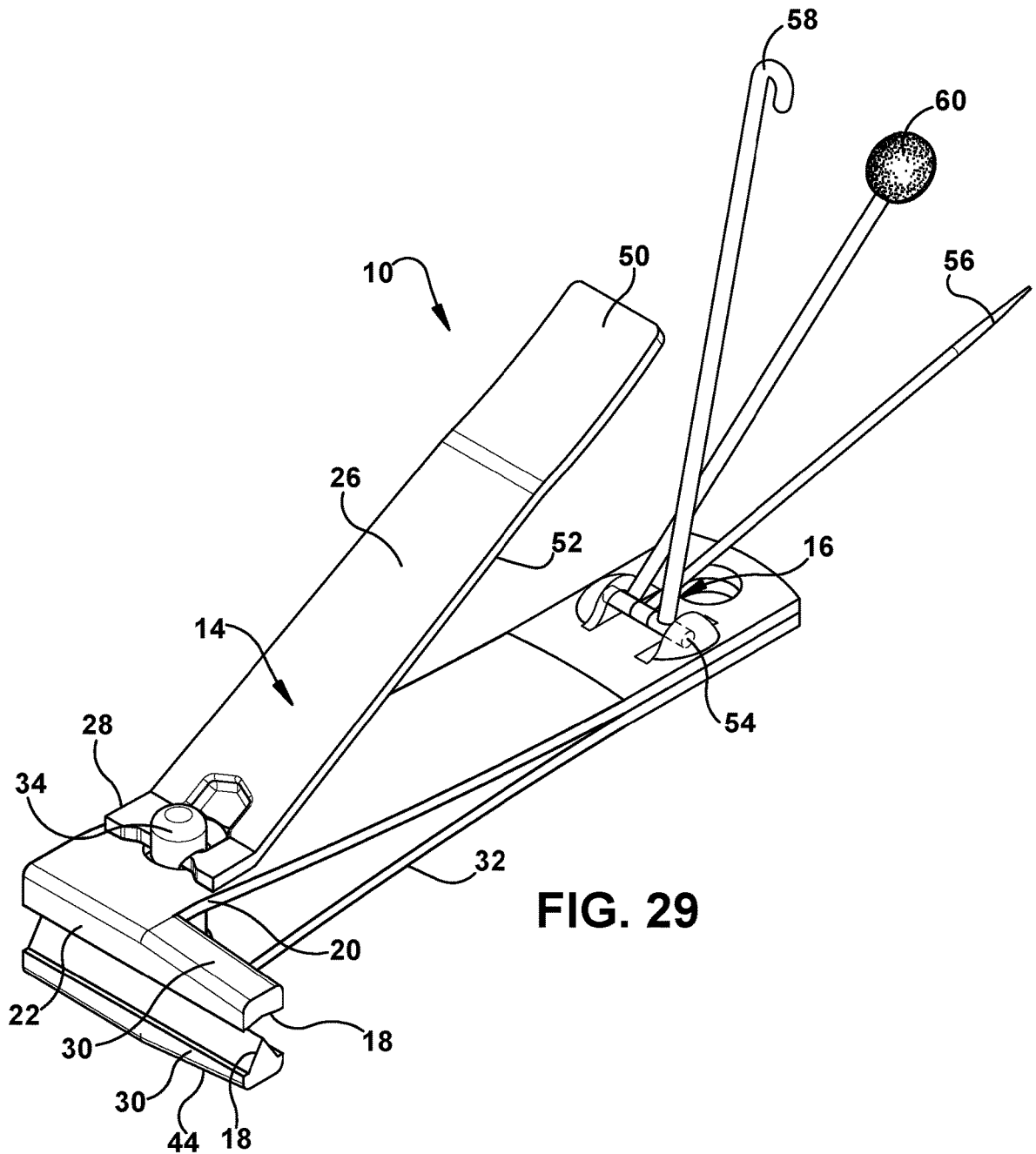
FIG. 29 depicts a perspective view of yet another embodiment of the orthodontic tool according to the invention that incorporates a trimmer and a tool set.
Figure 30:
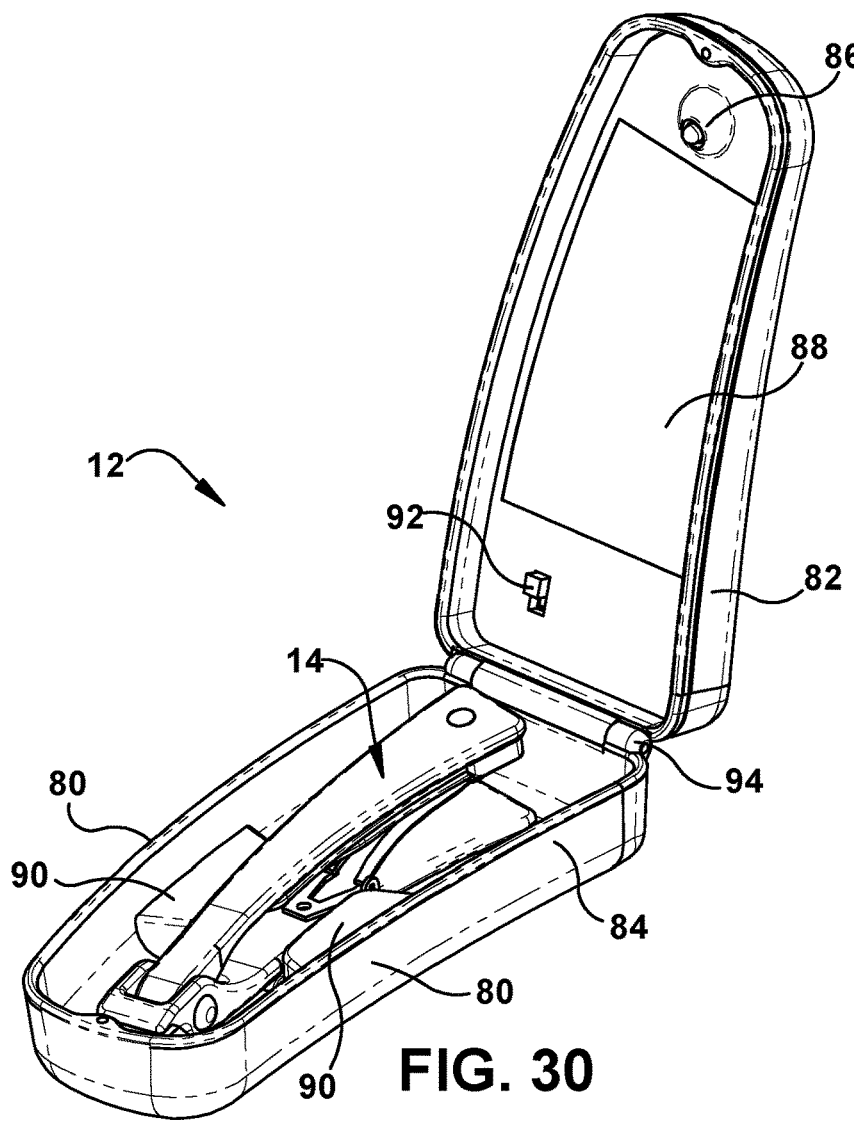
FIG. 30 depicts a perspective view of a storage container for storing and/or cleaning the trimmer in an open position, with a lid of the container being hinged in the rear of the container.
Figure 31:
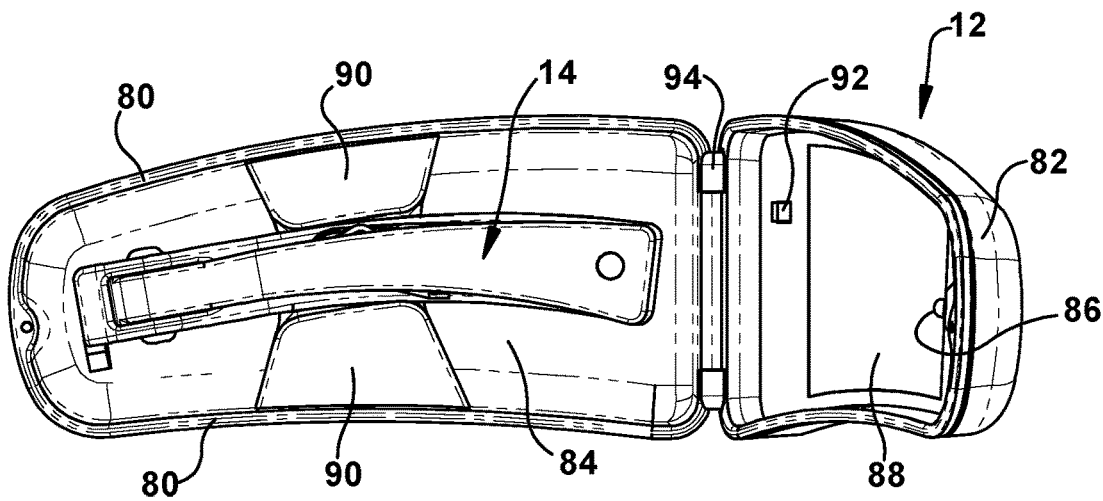
FIG. 31 depicts a top view of the storage container of FIG. 30 in the open position.
Figure 32:
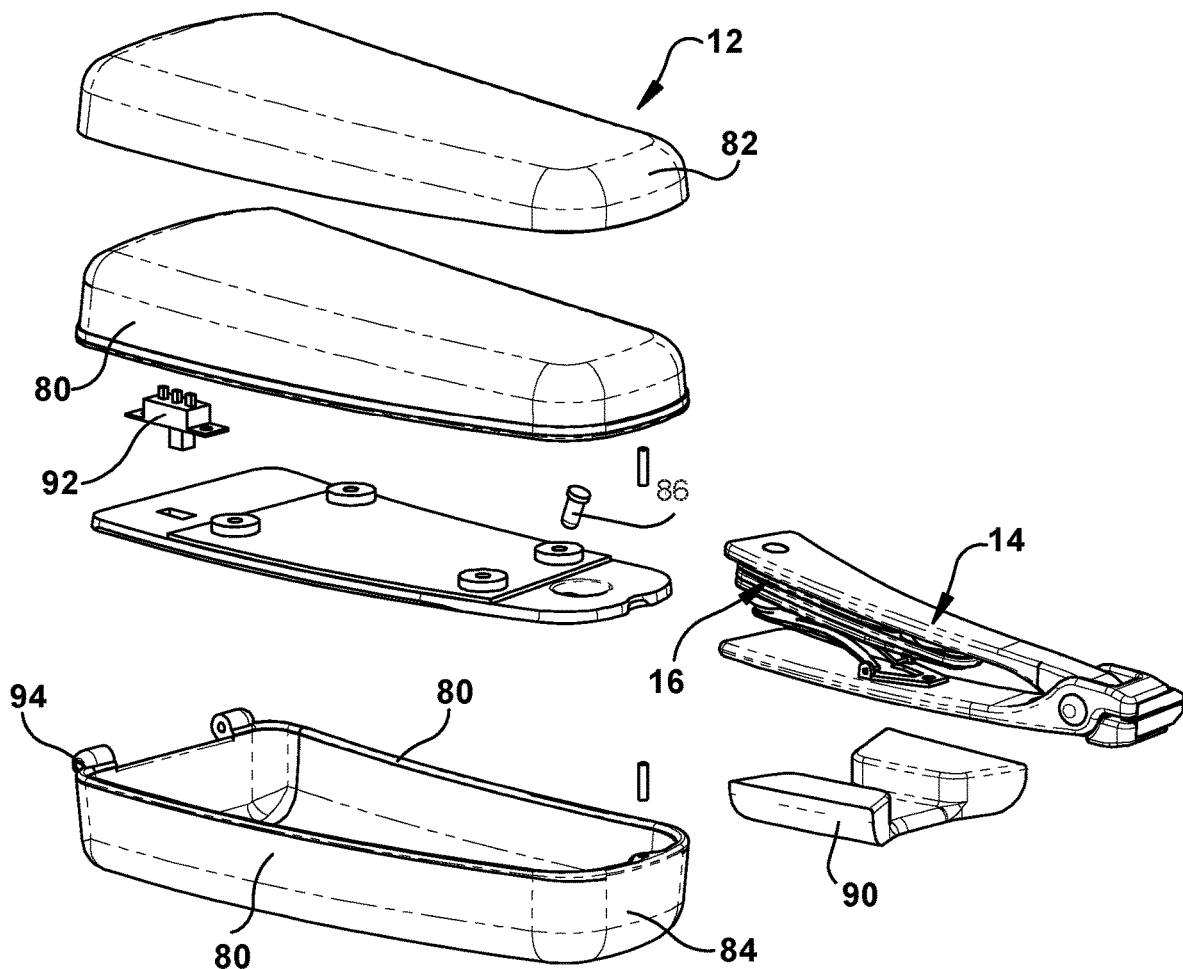
FIG. 32 depicts a perspective exploded view of the storage container of FIG. 30 along with a trimmer according to the invention.
Figure 33:
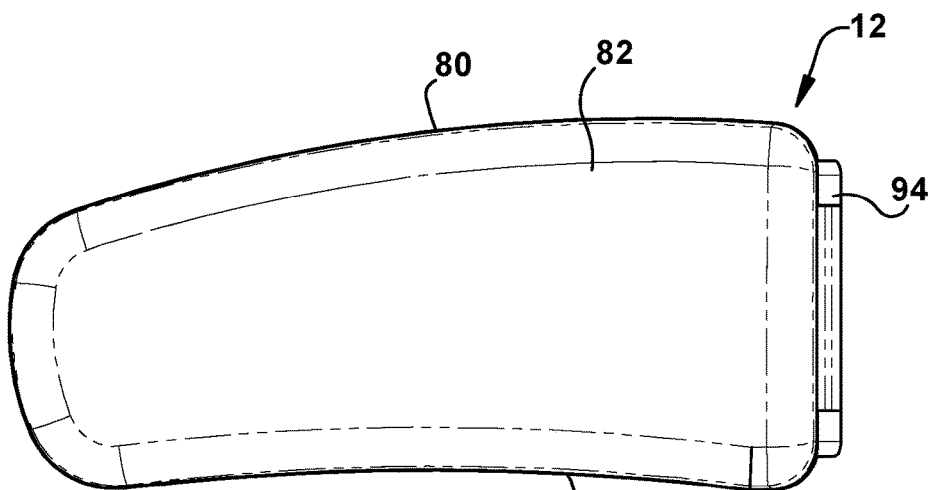
FIG. 33 depicts a top view of the storage container of FIG. 30 shown in a closed position.
Figure 34:
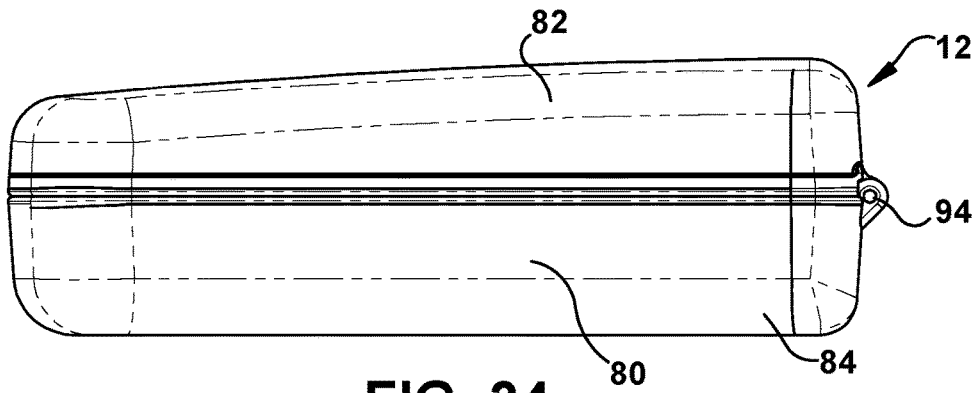
FIG. 34 depicts a side view of the storage container of FIG. 33 shown in a closed position.
Figure 35:
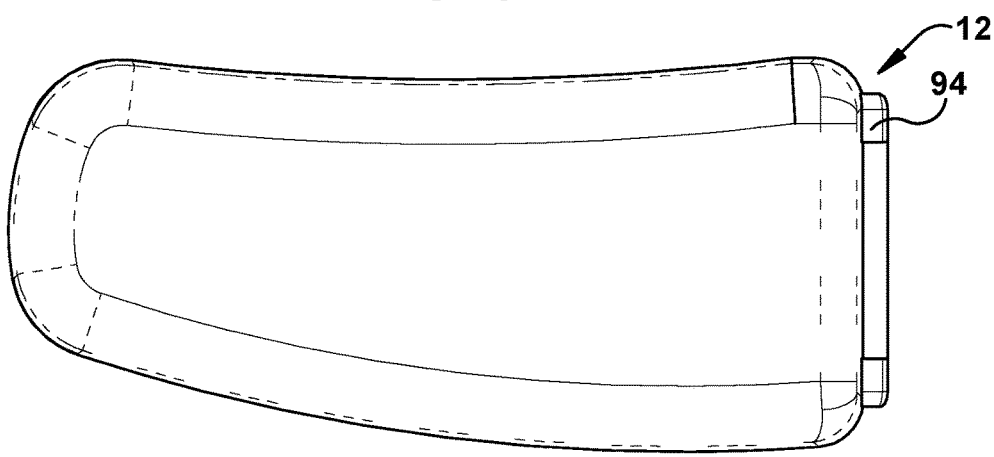
FIG. 35 depicts a bottom view of the storage container of FIG. 33 shown in a closed position.
Figure 36:
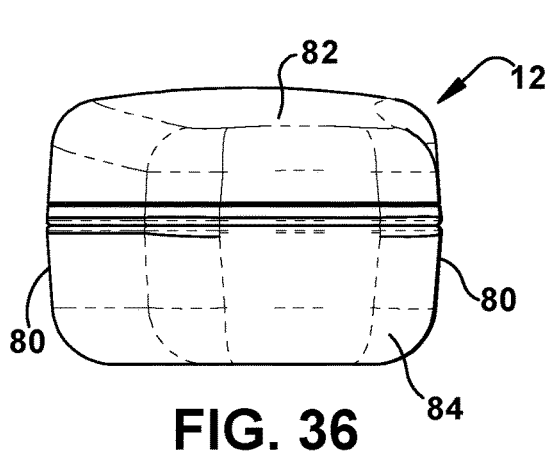
FIG. 36 depicts a front view of the storage container of FIG. 33 shown in a closed position.
Figure 37:
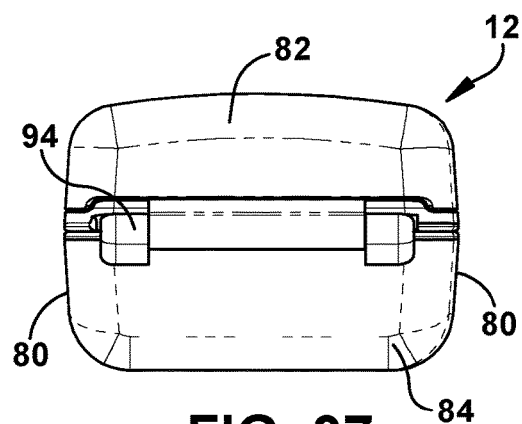
FIG. 37 depicts a rear view of the storage container of FIG. 33 shown in a closed position.
Figure 38:
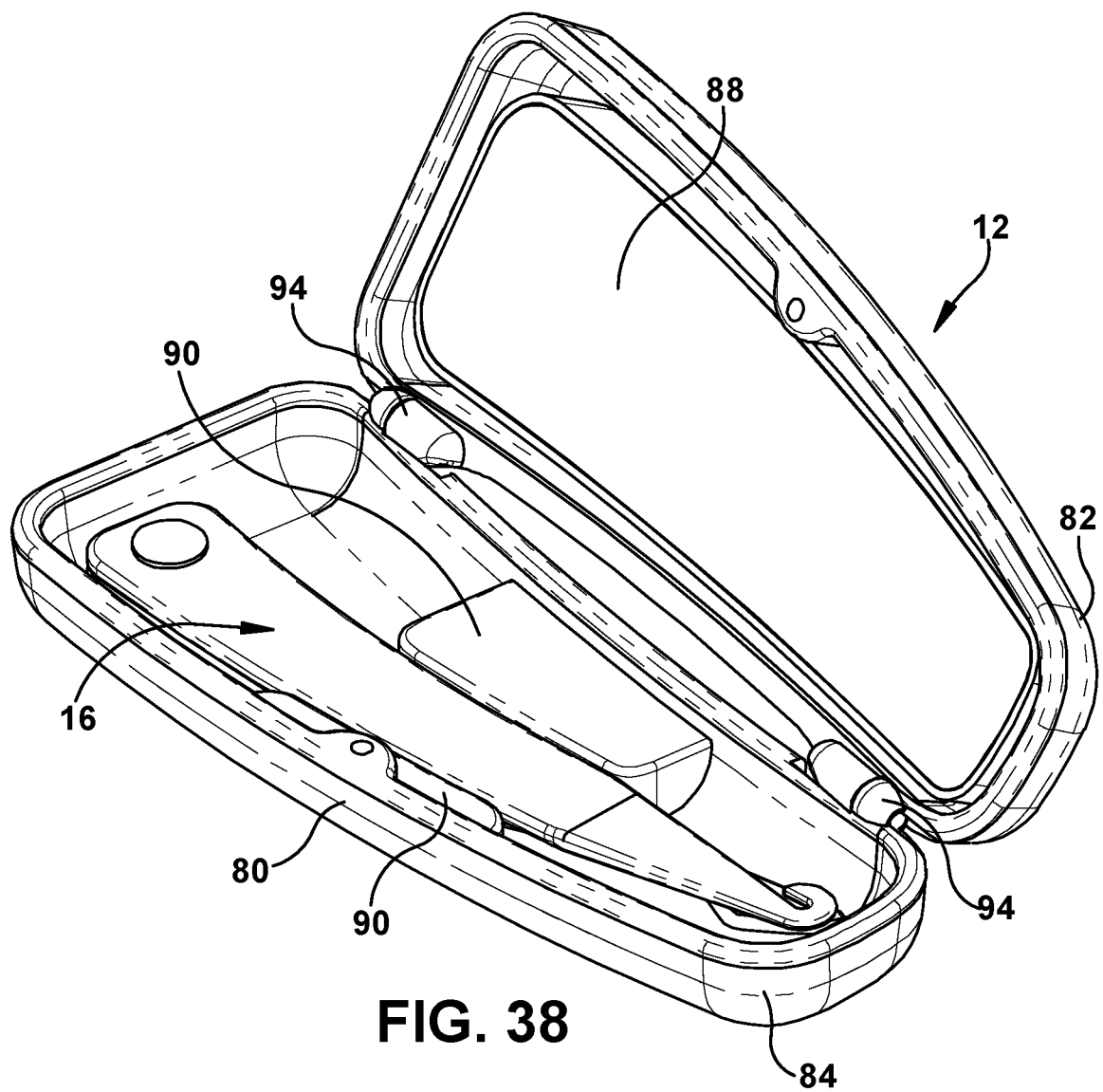
FIG. 38 depicts a perspective view of a storage container for storing and/or cleaning the tool set according to the invention, with the storage container in an open position and with a lid of the container being hinged along the side edge of the container.
Figure 39:
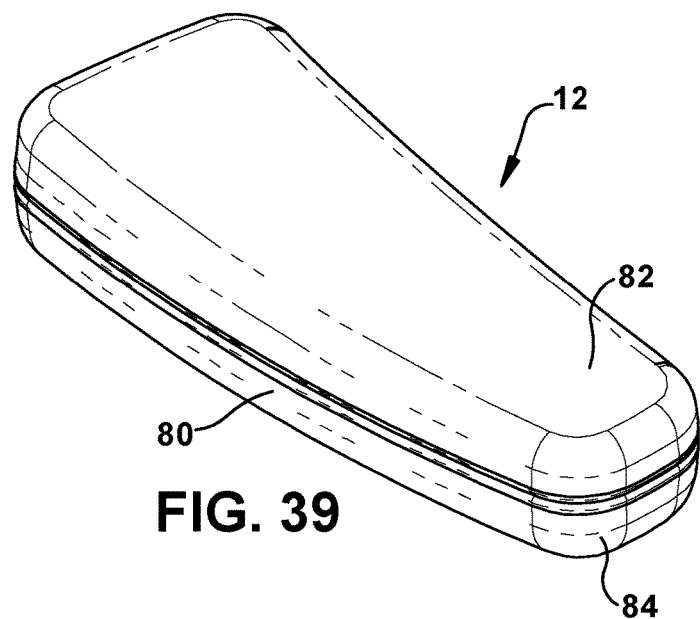
FIG. 39 depicts a perspective view of the storage container shown in FIG. 38 in a closed configuration.
Figure 40:
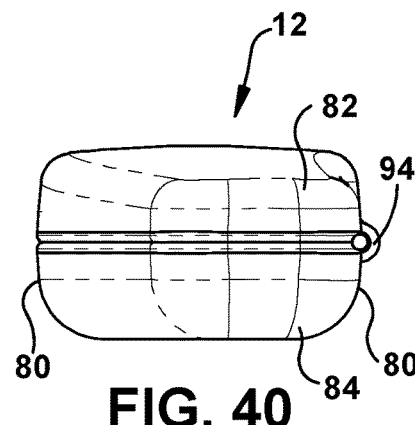
FIG. 40 depicts a front view of the storage container shown in FIG. 38 in a closed configuration.
Figure 41:
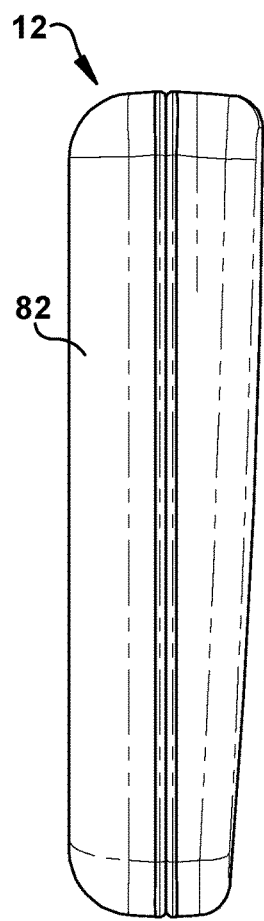
FIG. 41 depicts a left side view of the storage container shown in FIG. 38 in a closed configuration.
Figure 42:
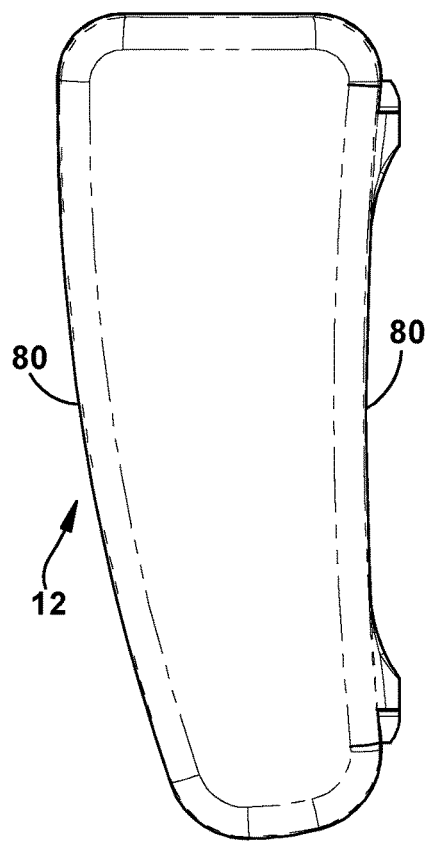
FIG. 42 depicts a top view of the storage container shown in FIG. 38 in a closed configuration.
Figure 43:
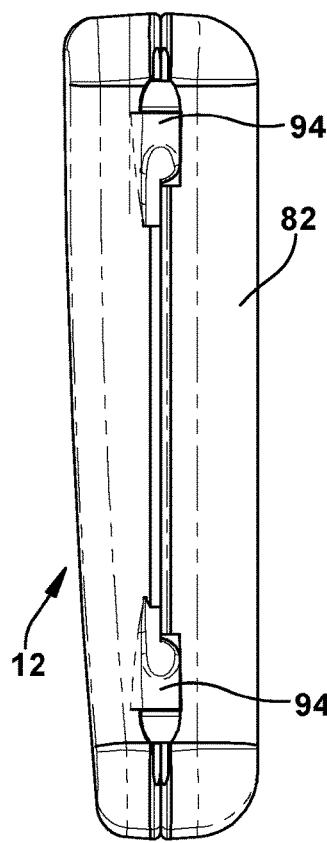
FIG. 43 depicts a right-side view of the storage container shown in FIG. 38 in a closed configuration.
Figure 44:
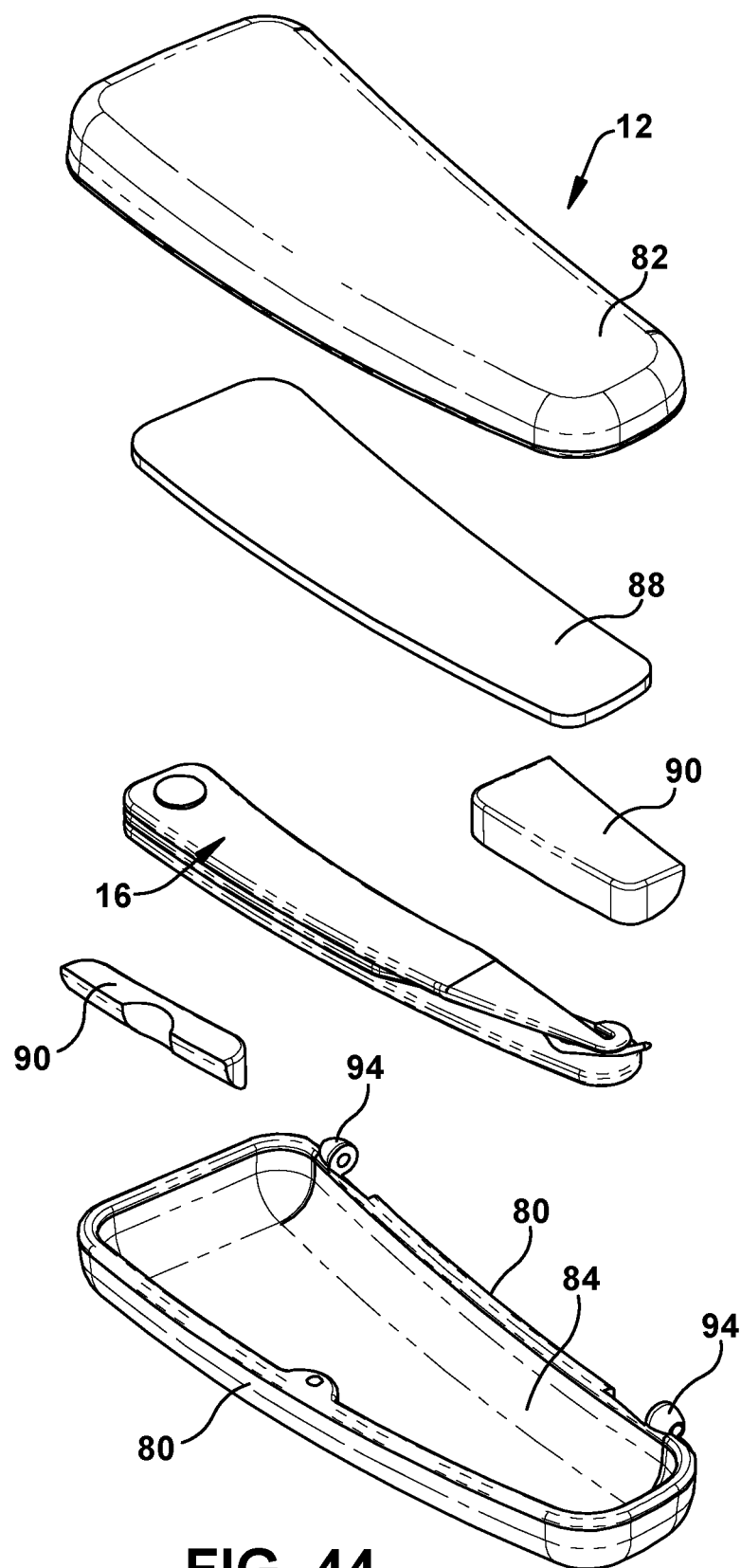
FIG. 44 depicts an exploded perspective view of the storage container shown in FIG. 38 along with the tool set.
Figure 45:
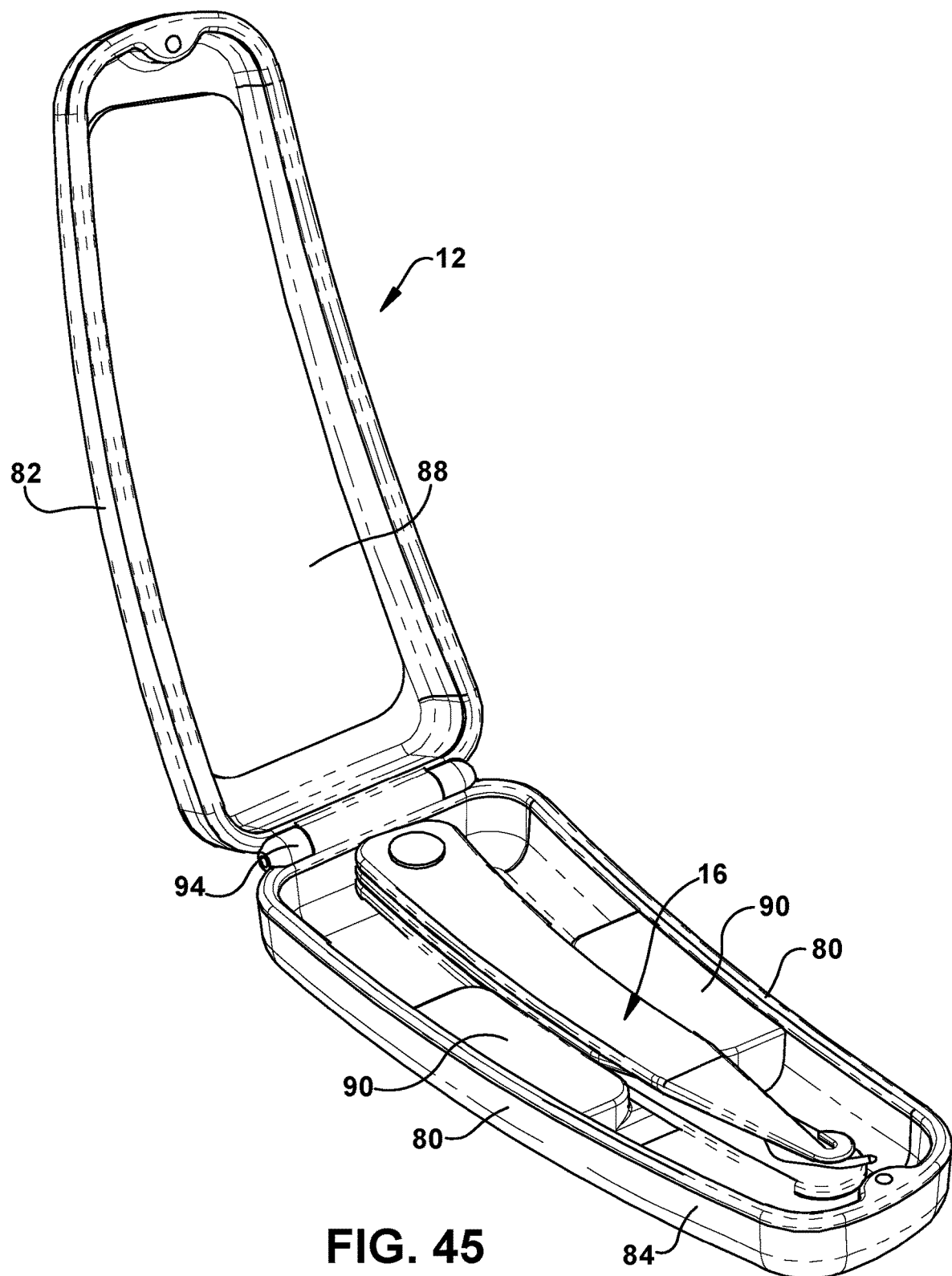
FIG. 45 depicts a perspective view of an alternative storage container for holding the tool set, with the hinge positioned along the rear side of the storage container and with the storage container in an open configuration.
Figure 46:
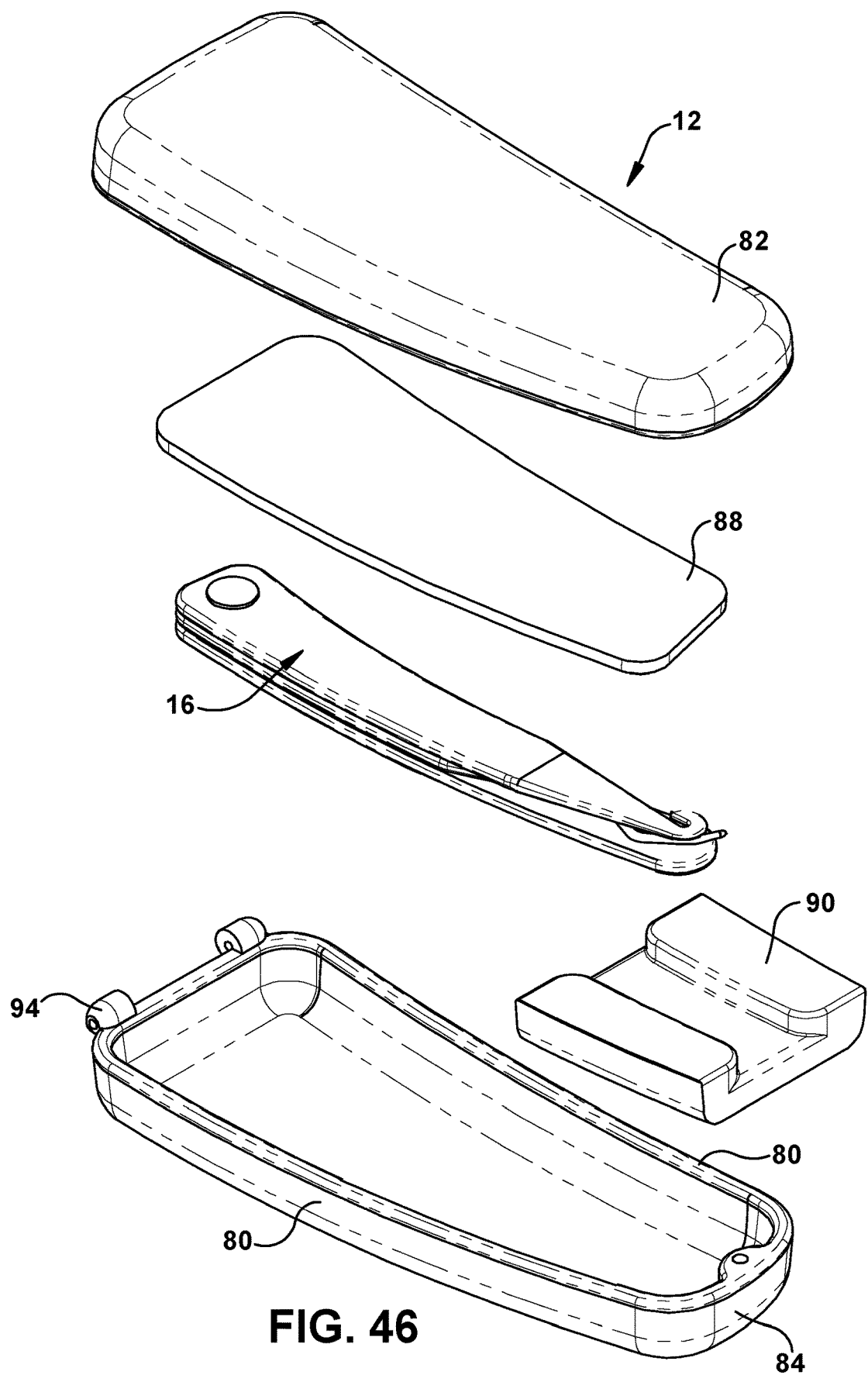
FIG. 46 depicts an exploded perspective view of the storage container shown in FIG. 45 along with the tool set.
Figure 47:
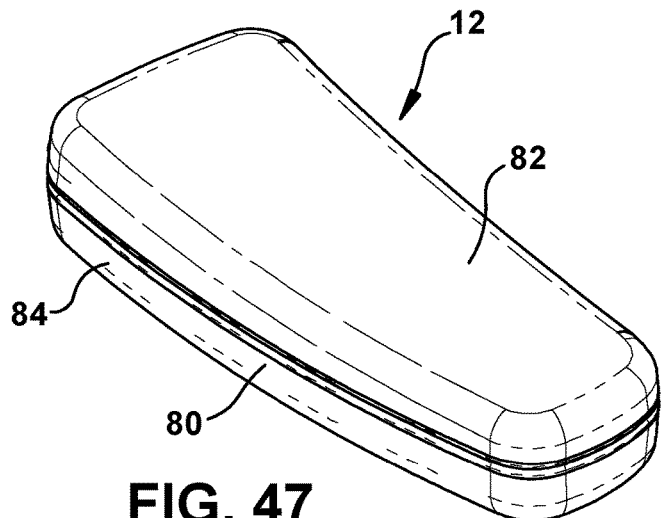
FIG. 47 depicts a perspective view of the storage container shown in FIG. 45 in a closed configuration.
Figure 48:
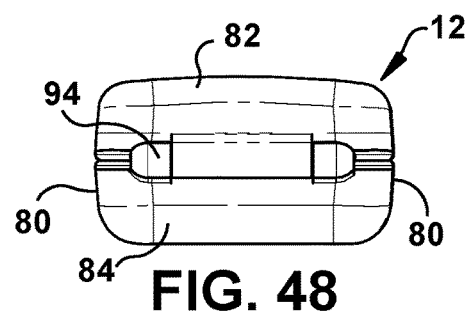
FIG. 48 depicts a rear view of the storage container shown in FIG. 45 in a closed configuration.
Figure 49:
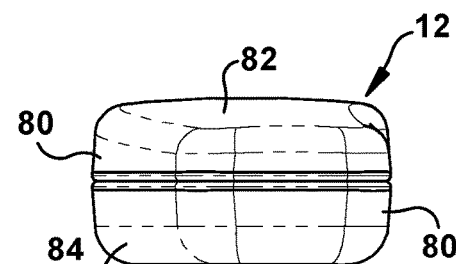
FIG. 49 depicts a front view of the storage container shown in FIG. 45 in a closed configuration.
Figure 50:
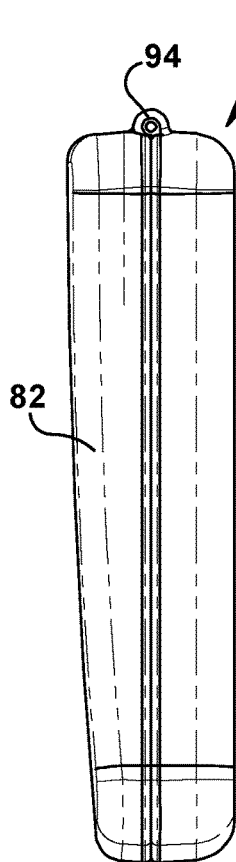
FIG. 50 depicts a left side view of the storage container shown in FIG. 45 in a closed configuration.
Figure 51:
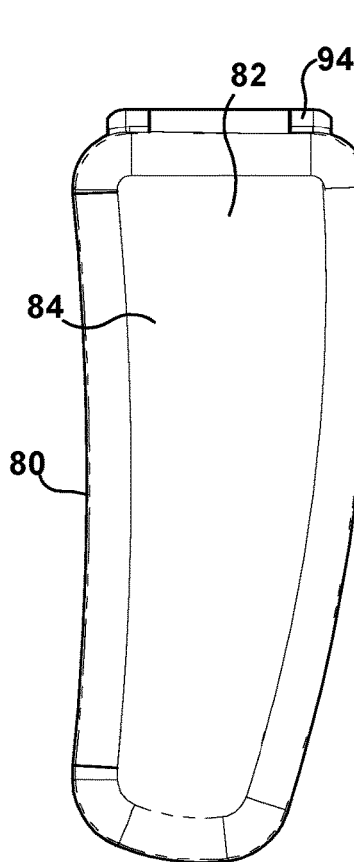
FIG. 51 depicts a top view of the storage container shown in FIG. 45 in a closed configuration.
Figure 52:
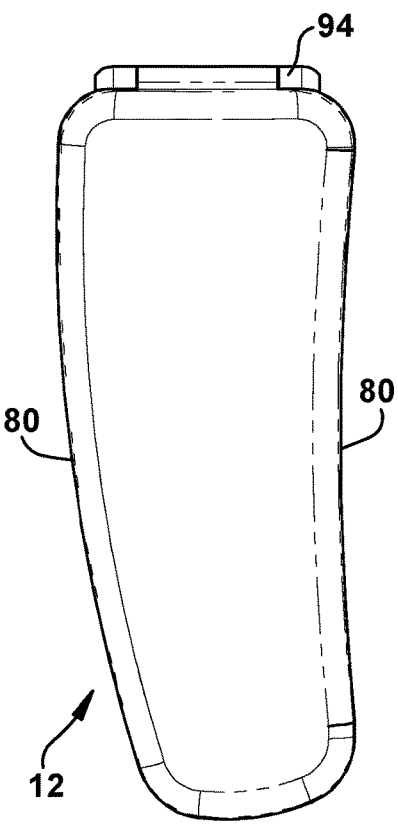
FIG. 52 depicts a bottom view of the storage container shown in FIG. 45 in a closed configuration.
Figure 53:
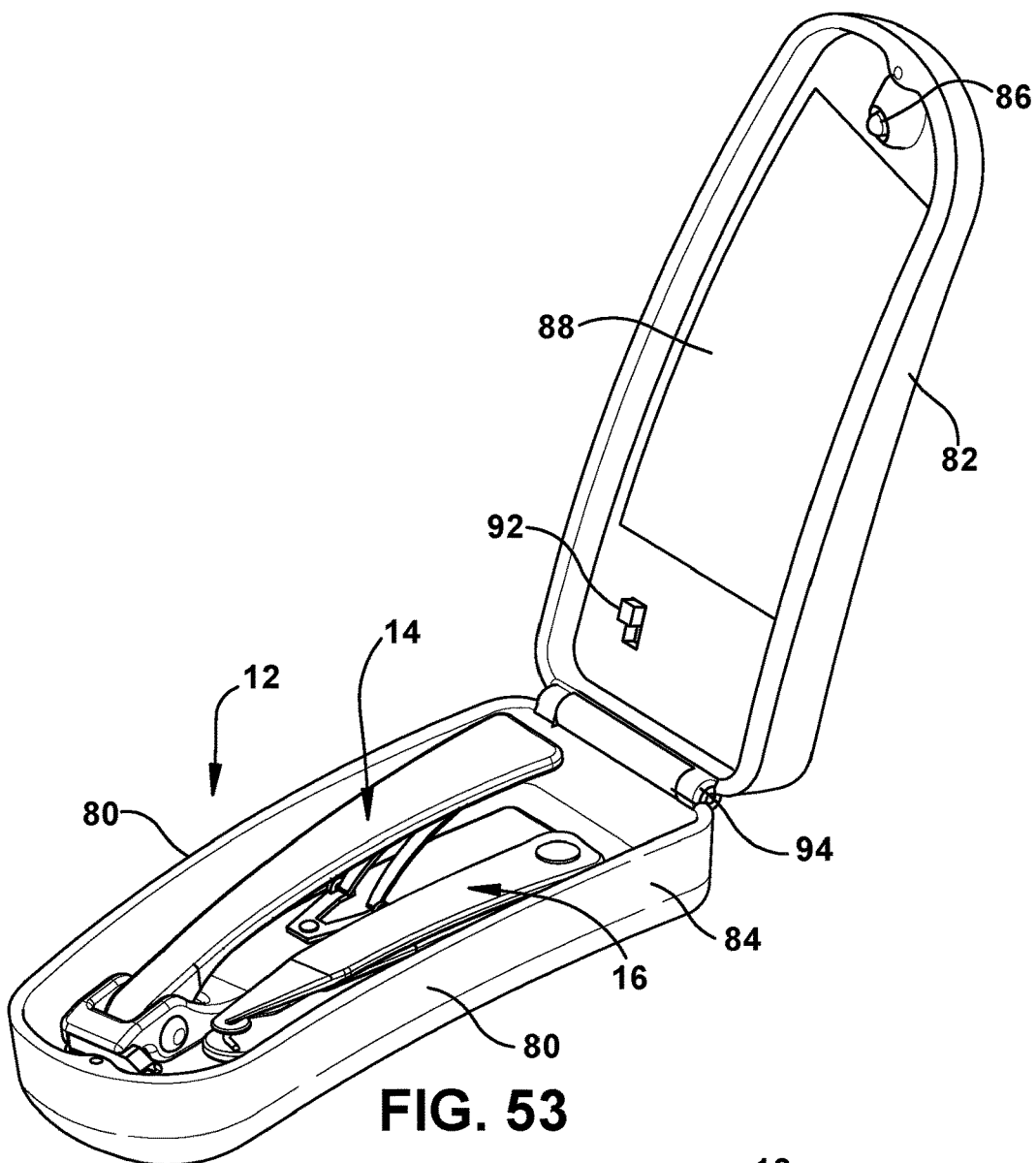
FIG. 53 depicts a perspective view of an alternative embodiment of the storage container for holding a trimmer and a separate tool set in side-by-side relation in a storage container.
Figure 54:
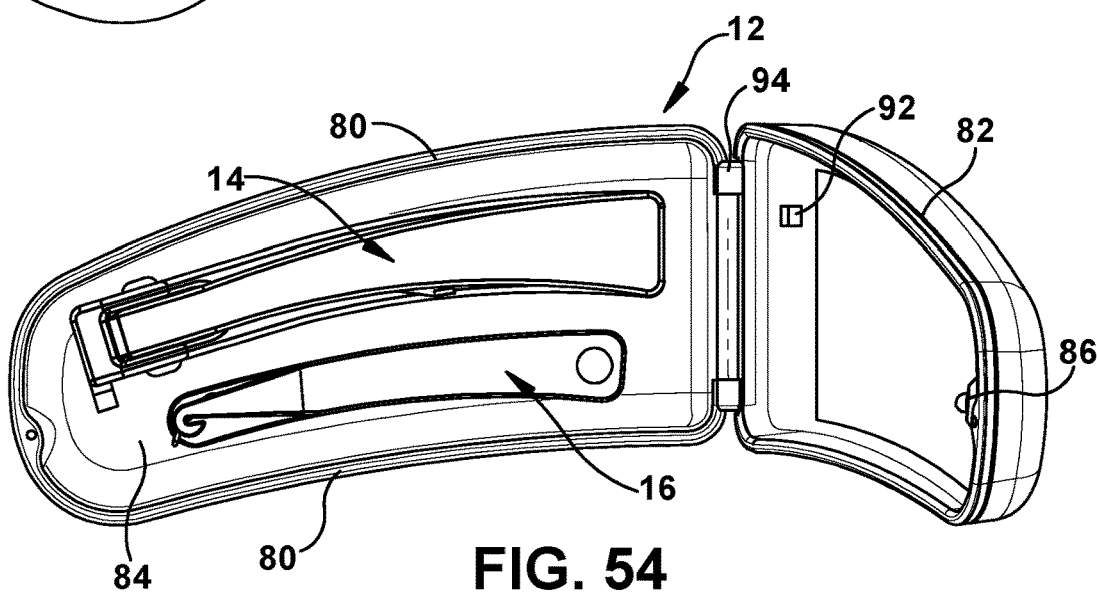
FIG. 54 depicts a top view of the storage container shown in FIG. 53 with the trimmer and tool set installed in the storage container.

FIG. 29 depicts an alternative embodiment of the handheld wire trimmer 14 shaped more like a conventional nail clipper but having an extension/protrusion 30 at the side 20 of the trimmer 14 for cutting a wire in a user's mouth. The protrusion 30 creates an L-shape at the leading end 28 thereof, with the lever/handle 26 forming the vertical portion of the L and the protrusion 30 forming the horizontal portion of the L-shape. The trimmer 14 is similar to a traditional nail clipper, except the cutting edges 18 of the trimmer 14 extend outwardly to the side of the device, e.g., perpendicular to the angle of the cutting blades of a traditional nail clipper and perpendicular to the longitudinal axis of the trimmer 14 to permit cutting of a wire that is positioned to the side 20 of the trimmer 14. As described above, occasionally wires associated with traditional braces can irritate a user's mouth, either because they are left too long, or because they become displaced. Orthodontists often supply pliable wax that a user can put on these sharp ends to soften the pain and to deter further damage to the user's skin in the mouth. The orthodontic tool 10 helps to avoid unnecessary orthodontic visits by allowing the braces wearer to clip the wire until their next appointment. This may also allow the user to avoid the use of wax to cover up wires that are irritating. In addition, if a user has run out of wax, the tool can be used as an alternative to wax.

FIGS. 30-54 depict various embodiments of an orthodontic storage container 12 for use with the trimmer 14 and/or the tool set 16. The orthodontic storage container 12 is box-shaped in that it has side walls 80, a lid 82, and a base 84. The storage container 12 may include a UV-C LED light fixture 86 positioned inside the box along with a mirror 88, such as a plastic mirror. Each container 12 may be shaped to fit a particular tool and may have stabilizing/positioning members 90 in the interior thereof for receiving tools 14, 16 so that they do not rattle around in the interior when the container 12 is closed.

Different shapes may be used for the container 12, as desired. A curved, tusk-shaped container 12 may be used, such as shown in the figures. A rectangular or square box shape (not shown) may be used, if desired. Other shapes may be used, if desired.

The storage container 12 may be used simply for storage, with the interior configured and/or shaped for receiving a trimmer 14 or tool set 16. The container 12 may include a mirror 88 so that a user can use the mirror 88 to see inside their mouth to use the tool set 16 and trimmer 14. The container 12 may include a light/lamp 86 that illuminates the interior of a user's mouth. The container 12 may be used for both storage and cleaning, with the interior of the device including UV-C LED lights 86 that can be used for sterilizing the contents of the container 12 when the lid 82 is closed. An on/off switch or button 92 may be positioned on an exterior or interior surface of the container 12 for turning on a light or the UV-C Led lights 86. The lights 86 may be positioned at any number of locations inside the containers 12, with some locations being shown, but with many options not being shown.

The entire interior of each container 12 may be mirrored. Alternatively, only one surface in the interior may be mirrored. The exterior of the container 12 may be opaque or clear, as desired. The container 12 may include circuitry, attachments, electrical leads, batteries, and the like to permit the lights to go on and off, as known by those of skill in the art. The container 12 may include a closure to close the container 12.

The container 12 may be hinged along the rear end by a hinge 94 or along the side edges using any type of hinge 94 desired. The hinges 94 shown utilize pins and pin-receiving members. Other types of hinges 94 may be used. The various parts of the container 12 may be coupled together in any known manner, such as by using pins, screws, or the like. The container 12 may be chargeable or may include non-rechargeable batteries (not shown).

FIGS. 30-37 depict a first storage container 12 for receiving the trimmer 14 or the trimmer 14 in combination with the tool set 16. The hinge 94 is positioned at a rear end. The storage container 12 includes an on/off switch 92 along with an LED light 86 that can be used for lighting and/or sterilization. The trimmer 14 is held centered in the base 84 of the container 12 via shoulders 90 that trap the trimmer 14 in position in the container 12.

FIGS. 38-46 depict a second storage container 12 for receiving a tool set 16. The container 12 includes a shoulder 90 for helping to maintain the tool set 16 in the base 84 of the container 12. The hinge 94 is positioned along the side 80 of the container 12.

FIGS. 47-54 depict a third storage container 12 for receiving both a trimmer 14 and a separate tool set 16 that is positioned adjacent the trimmer 14 in the base 84 of the container 12. The lid 82 of the storage container 12 is hinged to the base 84 of the container 12 along a rear surface. The lid 82 of the container 12 includes an on/off switch 92 for lighting an LED light 86 that is used for either lighting and/or sterilization. In addition, a mirror 88 is positioned inside the lid 82.

The trimmer 14 and orthodontic tool set 16 can be made of metal or plastic as long as the material is sufficiently strong to withstand the pressures needed for proper operation. The container 12 may be made of plastic or of any other material, as desired. Different sizes and shapes may be used. A fastener other than a magnet can be used to couple the spring 24 to the rear end of the trimmer 14.

An orthodontic tool 10 includes a trimmer 14 and a tool set 16. The trimmer 14 has a lever 26, a base 32, a leading edge associated with both the lever 26 and the base 32, and a spring 24 positioned between the lever 26 and the base 32. A first substantially transversely extending portion 30 extends from the lever 26 and a second substantially transversely extending portion 30 extends from the base 32. The first and second transversely extending portions 30 are substantially aligned with one another and have cutting surfaces 18 respectively associated therewith. When the lever 26 is pressed towards the base 32, the cutting surfaces 18 engage one another to cut a wire.

The tool set 16 has at least two arms 72 coupled together at one end by a fastener 54. The arms 72 are movable about the fastener 54 and each arm 72 has a free end 78. The tool set 16 includes two or more of a sanding tool 60, a hook 58, and a pick 56. The tool set 16 is either permanently coupled to the trimmer 14, separate from the trimmer 14, or coupled to the trimmer 14 but removable from the trimmer 14.

In an alternative embodiment, a single cutting blade or surface 18 can be used on one of the transversely extending portions 30, with the other transversely extending portion 30 having a block or surface against which the cutting blade or surface acts 18.

The spring 24 may be movable between an operable position and an inoperable position. The base 32 may be coupled to the lever 26 via a pin 34 that permits the lever 26 to rotate relative to the base 32.

The trimmer 14 may have a leading end 28 for engaging with a patient's mouth and a rear end 50 for pressing the lever 26 toward the base 32. The first and second substantially transversely extending portions 30 may be positioned at the leading end 28.

The fastener 54 of the tool set 16 may be positioned at the rear end 50 of the trimmer 14 for coupling the tool set 16 to the trimmer 14. The fastener 54 may be a pin 54 that extends through the lever 26 and through the tool set 16 to couple the tool set 16 to the lever 26. The tool set 16 may be movable with movement of the lever 26. The tool set 16 may be rotatable about the pin 54 to extend the arms 72 of the tool set 16 away from the rear end 50 of the lever 26.

A magnet 64 may be positioned under the fastener 54 for mating with the spring 24 when the spring 24 is in the operable position. The lever 26, the base 32, and the tool set 16 each may have a complementary shape that is curved.

According to another embodiment of the invention, an orthodontic trimmer 14 for use in a user's mouth includes a lever 26, a base 32, a spring 24, a first transversely extending portion 30, and a second transversely extending portion 30. The lever 26 has a leading edge 22. The base 32 has a leading edge 22. The spring 24 is positioned between the lever 26 and the base 32. The first transversely extending portion 30 extends from the lever 26. The second transversely extending portion 30 extends from the base 32. The first and second transversely extending portions 30 are positionally aligned and have one or more cutting blades or surfaces 18 respectively associated therewith. When the lever 26 is pressed towards the base 32, the cutting blades or surfaces 18 engage one another to cut a wire.

The spring 24 may be movable between an operable position and an inoperable position. When the spring 24 is in the operable position, the lever 26 is angled at an angle ranging between about 10 degrees to about 40 degrees relative to the base 32. In another embodiment, when the spring 24 is in the operable position, the lever 26 is angled at an angle ranging between about 15 degrees to about 30 degrees relative to the base 32. The base 32 may be coupled to the lever 26 via a pin 34 that permits the lever 26 to rotate relative to the base 32.

The trimmer 14 may have a leading end 28 for engaging with a patient's mouth and a rear end 50 for pressing the lever 26 toward the base 32. The first and second substantially transversely extending portions 30 may be positioned at the leading end 28.

The trimmer 14 may also include a magnet 64 positioned at the rear end 50 of the lever 26 for mating with the spring 24 when the spring 24 is in the operable position. Wherein the lever 26 and the base 32 may have a complementary shape that is curved.

In yet another embodiment, an orthodontic tool set 16 for use with braces or aligners includes a plurality of arms 72 rotatably coupled together about a fastener 54. Each arm 72 has a free end 78 opposite the fastener 54. A tool is positioned on each arm 72 at the free end 78 including a pick 56, a sanding pad 60, and a hook 58.

Each arm 72 of the plurality of arms 72 may be a substantially flat sheet of metal. The fastener may be a pin 54 that extends through all the arms 72.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially," if used herein, means the specified materials or steps and those that do not materially affect the basic and novel characteristics of the material or method. The articles "a," "an," and "the," should be interpreted to mean "one or more" unless the context indicates the contrary.

What is claimed is:

1. An orthodontic tool for a patient wearing braces or aligners to straight their teeth comprising:
    a trimmer having a lever, a base, a leading edge on both the lever and the base, a spring positioned between the lever and the base, and a first substantially transversely extending portion extending from the lever and a second substantially transversely extending portion extending from the base, with the first and second transversely extending portions being substantially aligned with one another and having cutting surfaces respectively associated therewith, wherein when the lever is pressed towards the base, the cutting surfaces engage one another to cut a wire and the combination of the first and second transversely extending portions are shaped to hold the cut wire for removal from the mouth; and
    a tool set having at least two arms coupled together at one end by a fastener, with the arms being movable about the fastener and each arm having a free end, said tool set comprising two or more of:
        an arm having a sanding tool positioned at the free end thereof opposite the pin fastener, the sanding tool comprising a file or sanding pad for sanding and smoothing a part of a plastic aligner for an aligner patient, or an end of a metal wire;
        an arm having a hook positioned at the free end thereof opposite the fastener the hook being configured to permit a patient to remove an aligner from the teeth or to install or remove a rubber band from an aligner or from a bracket of braces; and
        an arm having a pick positioned at the free end thereof opposite the fastener, the pick being configured to permit a patient to remove food or debris from between the patient's teeth for patients wearing braces or aligners, for unlocking brackets of braces when lose off a braces wire, or for removal of a rubber band from a bracket of braces of a braces patient,
    wherein the tool set is permanently coupled to the trimmer, the tool set is separate from the trimmer, or the tool set is coupled to the trimmer but removable from the trimmer
    wherein the tool is for self-use by the patient in the patient's mouth.

2. The orthodontic tool of claim 1, wherein the spring is movable between an operable position and an inoperable position.

3. The orthodontic tool of claim 1, wherein the base is coupled to the lever via a pin that permits the lever to rotate relative to the base.

4. The orthodontic tool of claim 1, wherein the trimmer has a leading end for engaging with a patient's mouth and a rear end for pressing the lever toward the base and the first and second substantially transversely extending portions are positioned at the leading end.

5. The orthodontic tool of claim 4, wherein the fastener of the tool set is positioned at the rear end of the trimmer for coupling the tool set to the trimmer.

6. The orthodontic tool of claim 1, wherein the fastener is a post that extends through the tool set.

7. The orthodontic tool of claim 6, wherein the tool set is rotatable about the pin to extend the arms of the tool set away from the rear end of the lever.

8. The orthodontic tool of claim 1, wherein the lever and the base have a complementary shape that is curved.

9. The orthodontic tool set of claim 1, wherein each arm of the plurality of arms is a substantially flat sheet of metal.

* * * * *